(12) United States Patent
Kim et al.

(10) Patent No.: US 12,095,974 B2
(45) Date of Patent: Sep. 17, 2024

(54) BEAM DEFLECTION LAYER AND 3-DIMENSIONAL DISPLAY DEVICE INCLUDING THE SAME

(71) Applicant: SAMSUNG ELECTRONICS CO., LTD., Suwon-si (KR)

(72) Inventors: Young Kim, Yongin-si (KR); Jungkwuen An, Suwon-si (KR); Kanghee Won, Seoul (KR); Jong-Young Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/201,868

(22) Filed: Mar. 15, 2021

(65) Prior Publication Data

US 2021/0352266 A1 Nov. 11, 2021

(30) Foreign Application Priority Data

May 11, 2020 (KR) .................. 10-2020-0056153

(51) Int. Cl.
*H04N 13/32* (2018.01)
*H04N 13/324* (2018.01)
(52) U.S. Cl.
CPC .......... *H04N 13/32* (2018.05); *H04N 13/324* (2018.05); *H04N 2213/001* (2013.01)
(58) Field of Classification Search
None
See application file for complete search history.

(56) References Cited

U.S. PATENT DOCUMENTS

| 7,167,230 B2 | 1/2007 | Klaus et al. |
| 7,756,368 B2 | 7/2010 | Garrett et al. |
| 10,788,727 B2 | 9/2020 | Kim et al. |

(Continued)

FOREIGN PATENT DOCUMENTS

| EP | 3 474 069 A1 | 4/2019 |
| EP | 3 608 726 A1 | 2/2020 |

(Continued)

OTHER PUBLICATIONS

Communication dated Sep. 6, 2021 issued by the European Intellectual Property Office in counterpart European Application No. 21171307.8.

(Continued)

*Primary Examiner* — Mikhail Itskovich
(74) *Attorney, Agent, or Firm* — Sughrue Mion, PLLC

(57) ABSTRACT

A beam deflection layer includes: a first selective polarization conversion-splitter that splits first color light in an incident light beam into 1A color light and 1B color light having different polarization directions from each other; a first beam deflector that deflects the 1A first first color light in the light beam from the 1A first selective polarization conversion-splitter, a first selective polarization converter that converts polarization directions of the 1A first first color light and the 1B second first color light in the light beam from the 1A first beam deflector, and a 1B second beam deflector configured to deflect the 1B second first color light in the light beam from the first selective polarization converter. The first color light, the 1A color light, and the 1B color light each have a first wavelength band.

23 Claims, 9 Drawing Sheets

(56) References Cited

U.S. PATENT DOCUMENTS

| | | | |
|---|---|---|---|
| 2014/0092320 A1* | 4/2014 | Yamaguchi | G02F 1/133528 |
| | | | 349/5 |
| 2017/0200423 A1 | 7/2017 | Kim et al. | |
| 2018/0129105 A1 | 5/2018 | Kim et al. | |
| 2019/0008388 A1* | 1/2019 | Ando | G01J 3/0264 |
| 2019/0113802 A1 | 4/2019 | Won et al. | |
| 2019/0257993 A1 | 8/2019 | Kim et al. | |
| 2019/0331980 A1 | 10/2019 | Kim et al. | |
| 2021/0141301 A1* | 5/2021 | Homma | H04N 13/337 |
| 2021/0294115 A1 | 9/2021 | Won et al. | |
| 2023/0296977 A1 | 9/2023 | Homma et al. | |

FOREIGN PATENT DOCUMENTS

| | | |
|---|---|---|
| KR | 10-2018-0052356 A | 5/2018 |
| KR | 10-2019-0043438 A | 4/2019 |
| WO | 2019/012806 A1 | 1/2019 |

OTHER PUBLICATIONS

European Extended Search Report issued Jan. 5, 2024 by the European Patent Office for EP Patent Application No. 21171307.8.

* cited by examiner

BEAM DEFLECTION LAYER AND 3-DIMENSIONAL DISPLAY DEVICE INCLUDING THE SAME

CROSS-REFERENCE TO RELATED APPLICATION

This application is based on and claims priority from Korean Patent Application No. 10-2020-0056153, filed on May 11, 2020, in the Korean Intellectual Property Office, the disclosure of which is incorporated in its entirety herein by reference.

BACKGROUND

1. Field

Example embodiments of the disclosure relate to a beam deflection layer and a three-dimensional (3D) display device.

2. Description of Related Art

A display device, such a three-dimensional (3D) display device, may include a beam deflector that changes a traveling direction of light to achieve light directionality. However, a scattering phenomenon, that is, a fine path difference for each color of light deflected by a beam deflector, may occur. In order to eliminate the scattering phenomenon the driving of the beam deflector may be separately performed for each color. The separation method may include a spatial-multiplexing method and a time-multiplexing method.

In the spatial-multiplexing method, the space is portioned and a beam is deflected for each color, and thus, a system employing this method may be bulky. In the time-multiplexing method, a deflection direction is finely adjusted via a beam deflector according to each color by partitioning the time. As such, a system employing the time-multiplexing method may have be slow, since a response speed of the beam deflector should be three times that in the spatial-multiplexing method.

SUMMARY

Provided are beam deflection layers and 3D display devices including the beam deflection layer.

Additional aspects will be set forth in part in the description which follows and, in part, will be apparent from the description, or may be learned by practice of the presented embodiments of the disclosure.

According to an aspect of the disclosure, there is provided a beam deflection layer comprising: a first selective polarization conversion-splitter configured to split first color light in an incident light beam into first first color light and second first color light having different polarization directions from each other; a first beam deflector configured to deflect the first first color light in the light beam from the first selective polarization conversion-splitter; a first selective polarization converter configured to convert polarization directions of the first first color light and the second first color light in the light beam from the first beam deflector; and a second beam deflector configured to deflect the second first color light in the light beam from the first selective polarization converter; wherein the first color light, the first first color light, and the second first color light each have a first wavelength band.

The first selective polarization conversion-splitter rotates the polarization direction of the first color light by 45 degrees.

The first beam deflector comprises: a first horizontal deflector configured to horizontally deflect the first first color light in the light beam from the first selective polarization conversion-splitter; a first general-purpose polarization converter configured to convert a polarization direction of a light beam from the first horizontal deflector; and a first vertical deflector configured to vertically deflect the first color light in the light beam from the first general-purpose polarization converter.

The first selective polarization converter rotates polarization directions of the first first color light and the second first color light in the light beam from the first beam deflector by 90 degrees.

The second beam deflector comprises: a second vertical deflector configured to vertically deflect the second first color light in the light beam from the first selective polarization converter; a second general-purpose polarization converter configured to convert a polarization direction of the light beam received from the second vertical deflector; and a second horizontal configured to horizontally deflect the second first color light in the light beam from the second general-purpose polarization converter.

The beam deflection layer further comprises a second selective polarization conversion-splitter configured to split the first first color light in the light beam from the second beam deflector into first first first color light and second first first color light having different polarization directions from each other, and split the second first color light in the light beam from the second beam deflector into first second first color light and second second first color light having different polarization directions from each other; and a first polarizer configured to transmit light having one polarization direction in the light beam from the second selective polarization conversion-splitter.

The second selective polarization conversion-splitter is further configured to rotate the polarization directions of the first first color light and the second first color light in the light beam from the second beam deflector by 45 degrees.

The beam deflection layer further comprising: a third selective polarization conversion-splitter configured to split second color light in the light beam from the first polarizer into first second color light and second second color light having different polarization directions from each other; a third beam deflector configured to deflect the first second color light in the light beam from the third selective polarization conversion-splitter; a second selective polarization converter that converts polarization directions of the first second color light and the second second color light in the light beam from the third beam deflector; and a fourth beam deflector configured to deflect the second second color light in the light beam from the second selective polarization converter, wherein the second color light, the first second color light, and the second second color light each have a second wavelength band different from the first wavelength band.

The third selective polarization conversion-splitter is further configured to rotate the polarization direction of the second color light in the light beam from the first polarizer by 45 degrees.

The second selective polarization converter configured to rotate polarization directions of the first second color light and the second second color light in the light beam from the first second beam deflector by 90 degrees.

The third beam deflector comprises: a third horizontal deflector configured to horizontally deflect the first second color light in the light beam from the third selective polarization conversion-splitter; a third general-purpose polarization converter configured to convert a polarization direction of the light beam received from the third horizontal deflector; and a third vertical deflector configured to vertically deflect the first second color light in the light beam from the third general-purpose polarization converter, and the fourth beam deflector comprises: a fourth vertical deflector that vertically deflects the second second color light in the light beam from the second selective polarization converter; a fourth general-purpose polarization converter configured to convert a polarization direction of the light beam received from the second second vertical deflector; and a fourth horizontal deflector configured to horizontally deflect the second second color light in the light beam from the fourth general-purpose polarization converter.

The beam deflection layer further comprises a fourth selective polarization conversion-splitter configured to: split the first second color light in the light beam from the fourth beam deflector into first first second color light and second first second color light having different polarization directions from each other, and split the scond second color light in the light beam from the fourth beam deflector into first second second color light and second second second color light having different polarization directions from each other; and a second polarizer configured to pass light having the one polarization direction in the light beam from the fourth selective polarization conversion-splitter, wherein the fourth selective polarization conversion-splitter is further configured to rotate the polarization directions of the first second color light and the second second color light in the light beam from the fourth beam deflector by 45 degrees.

The beam deflection layer further comprises a fifth selective polarization conversion-splitter configured to split third color light of the light beam received from the second polarizer into first third color light and second third color light having different polarization directions from each other; a fifth beam deflector configured to deflect the first third color light in the light beam from the fifth selective polarization conversion-splitter; a third selective polarization converter that converts polarization directions of the first third color light and the second third color light in the light beam from the first beam deflector; and a sixth beam deflector that deflects the second third color light in the light beam from the third selective polarization converter, wherein the third color light, the first third color light, and the second third color light each have a third band wavelength different from the first wavelength band and the second wavelength band.

The fifth selective polarization conversion-splitter rotates the polarization direction of the third color light in the light beam from the second polarizer by 45 degrees.

The third selective polarization converter rotates polarization directions of the fifth color light and the sixth color light in the light beam from the fifth beam deflector by 90 degrees.

The fifth beam deflector comprises: a fifth horizontal deflector configured to horizontally deflect the first third color light in the light beam from the fifth selective polarization conversion-splitter; a fifth general-purpose polarization converter configured to convert polarization directions of the first third color light and the second third color light in the light beam the fifth horizontal deflector; and a fifth vertical deflector that vertically deflects the first third color light in the light beam the fifth general-purpose polarization converter, and the sixth beam deflector comprises: a sixth vertical deflector configured to vertically deflect the second third color light in the light beam from the third selective polarization converter; a sixth general-purpose polarization converter configured to convert polarization directions of the first third color light and the second third color light in the light beam from the sixth vertical deflector; and a sixth horizontal deflector configured to horizontally deflect the 3B color light in the light beam from the sixth general-purpose polarization converter.

The beam deflection layer further comprises: a sixth selective polarization conversion-splitter configured to split the first third color light in the light beam from the sixth beam deflector into first first third color light and second first third color light having different polarization directions from each other and the second third color light in the light beam from the sixth beam deflector into first second third color light and second second third color light having different polarization directions from each other; and a third polarizer configured to pass light having the one polarization direction in the light beam from the sixth selective polarization conversion-splitter, wherein the sixth selective polarization conversion-splitter is further configured to rotate the polarization directions of the first third color light and the second third color light in the light beam from the sixth beam deflector by 45 degrees.

According to another aspect of the disclosure, there is provided a three-dimensional display device comprising: a light source configured to output an optical beam in a plurality of wavelength bands; a beam deflection layer configured to deflect the light beam; a controller configured to control a deflection direction of the light beam in the beam deflection layer; and a spatial light modulator configured to form a holographic image by diffracting the light beam, wherein the beam deflection layer comprises: a first selective polarization conversion-splitter configured to split first color light in the light beam into first first color light and second first color light, the first first color light having different polarization directions from second first color light; a first beam deflector configured to deflect the first first color light in the light beam from the first selective polarization conversion-splitter; a first selective polarization converter configured to convert polarization directions of the first first color light and the second first color light in the light beam from the first beam deflector; and a second beam deflector configured to deflect the second first color light in the light beam from the first selective polarization converter; wherein the first color light, the first first color light, and the second first color light each have a first wavelength band.

The controller is further configured to control the beam deflection layer to focus a first part of the light beam towards a first position and focus a second part of the light beam towards a second position different from the first position.

The three-dimensional display device further comprises: a field lens provided between the beam deflection layer and the spatial light modulator, wherein the field lens is configured to focus a first part of the light beam towards a first position and focus a second part of the light beam towards a second position different from the first position.

According to another aspect of the disclosure, there is provided a beam deflection apparatus comprising: a first layer configured to divide an incident light beam into a first polarized light and second polarized light, the first polarized light and the second polarized light having a first wavelength band and having different polarization directions; a second layer configured to deflect the first polarized light from the first layer in a first direction; a third layer configured to convert polarization directions of the first polarized light and the second polarized light; and a fourth layer configured to deflect the second polarized light from the third layer in a second direction.

According to another aspect of the disclosure, there is provided a method of performing beam deflection comprising: dividing an incident light beam into a first polarized light and second polarized light, the first polarized light and the second polarized light having a first wavelength band and having different polarization directions; deflecting the first polarized light in a first direction; converting polarization directions of the first polarized light and the second polarized light after deflecting the first polarized light; and deflecting the second polarized light in a second direction after the converting the polarization directions of the first polarized light and the second polarized light.

According to another aspect of the disclosure, there is provided a control apparatus comprising: a memory storing one or more instructions, and a processor configured to execute the one or more instructions to control a beam deflector to: divide an incident light beam into a first polarized light and second polarized light, the first polarized light and the second polarized light having a first wavelength band and having different polarization directions; deflect the first polarized light in a first direction; convert polarization directions of the first polarized light and the second polarized light after deflecting the first polarized light; and deflect the second polarized light in a second direction after the converting the polarization directions of the first polarized light and the second polarized light.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
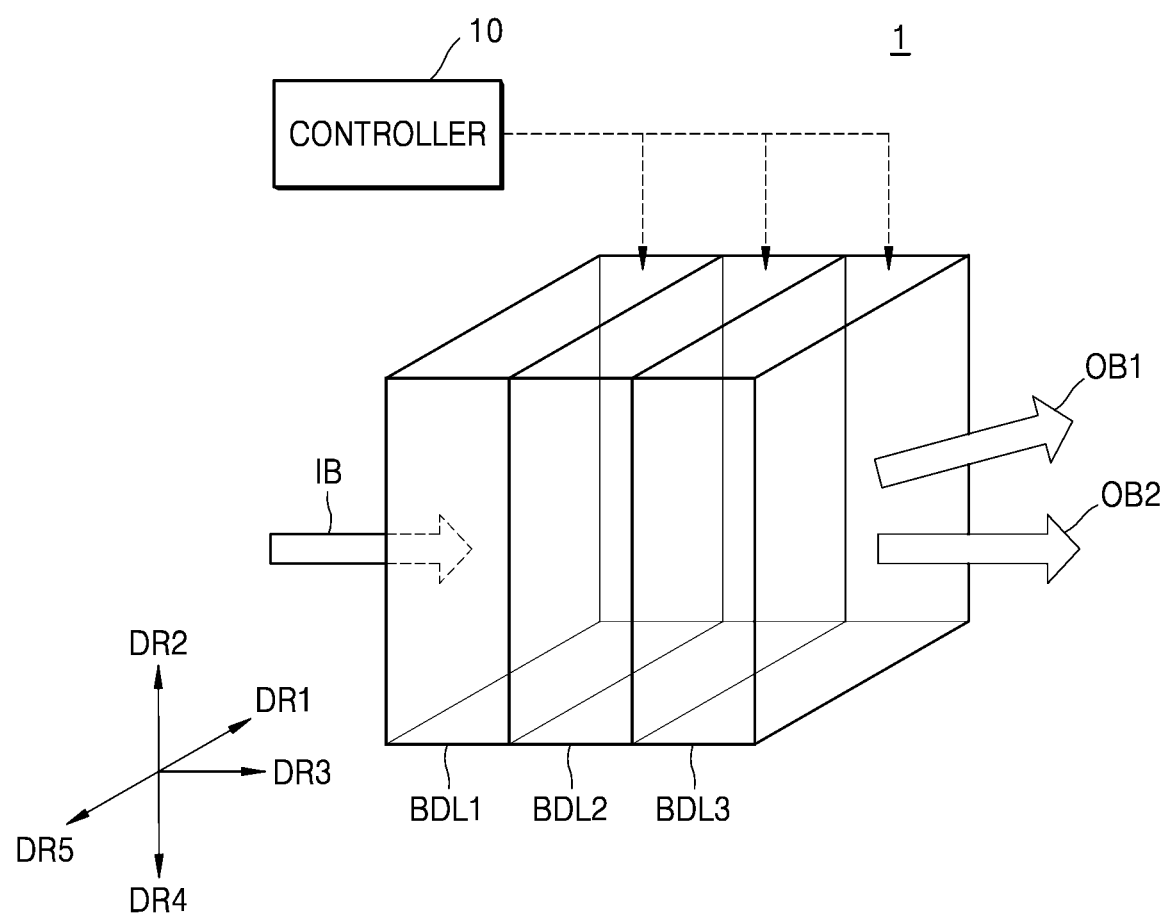
FIG. 1 is a conceptual diagram of a beam deflection layer according to an embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. The example embodiments of the inventive concept are capable of various modifications and may be embodied in many different forms. In the drawings, like reference numerals refer to like elements, and size of each constituent element may be exaggerated for clarity of explanation and convenience.

When an element or layer is referred to as being "on" or "above" another element or layer, the element or layer may be directly on another element or layer or intervening elements or layers.

Singular forms are intended to include the plural forms as well, unless the context clearly indicates otherwise. When a part "comprises", "includes" or "has" an element in the specification, unless otherwise defined, it is not excluding other elements but may further include other elements.

The term "above" and similar directional terms may be applied to both singular and plural.

In the disclosure, when it is described that light is deflected in a direction, the traveling direction of light may have a new or more components in the direction. For example, when light traveling in a third direction is deflected in a first direction, the light may travel in a direction on a basis of a combination of the third direction and the first direction.

Figure 2A:
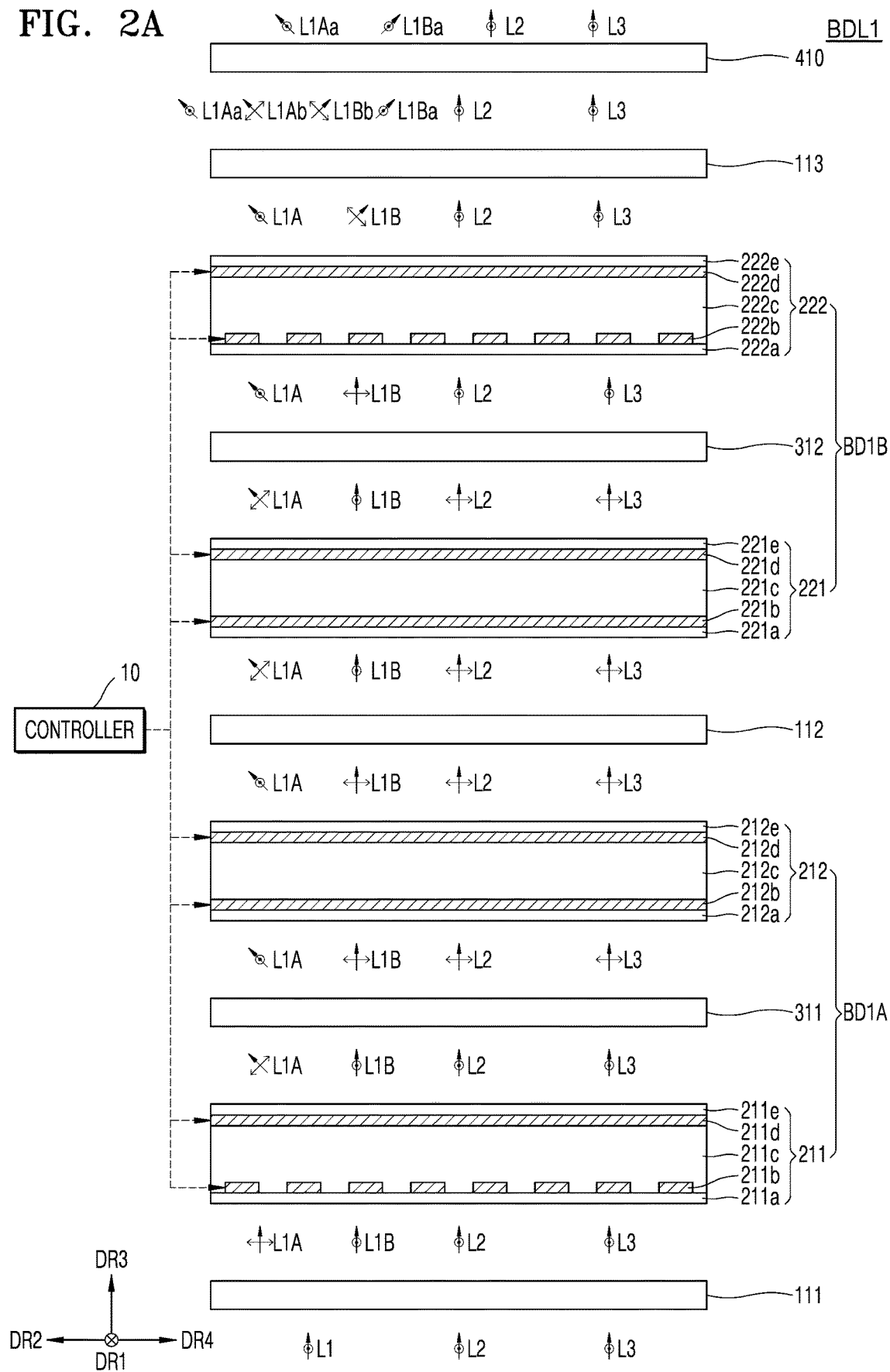
FIGS. 2A to 2C are conceptual diagrams in a first direction of the beam deflection layer of FIG. 1.
Figure 2B:
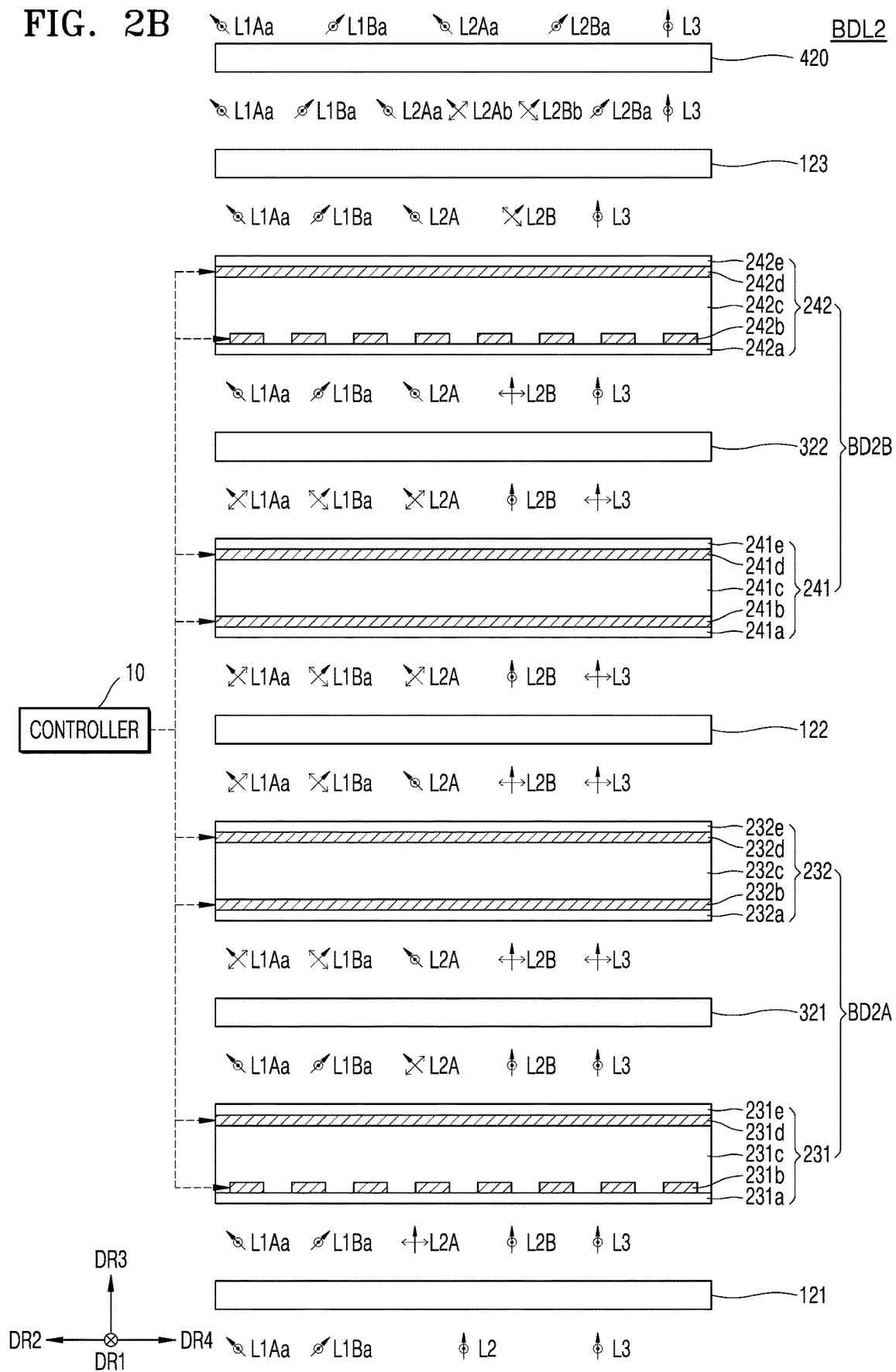
Figure 2C:
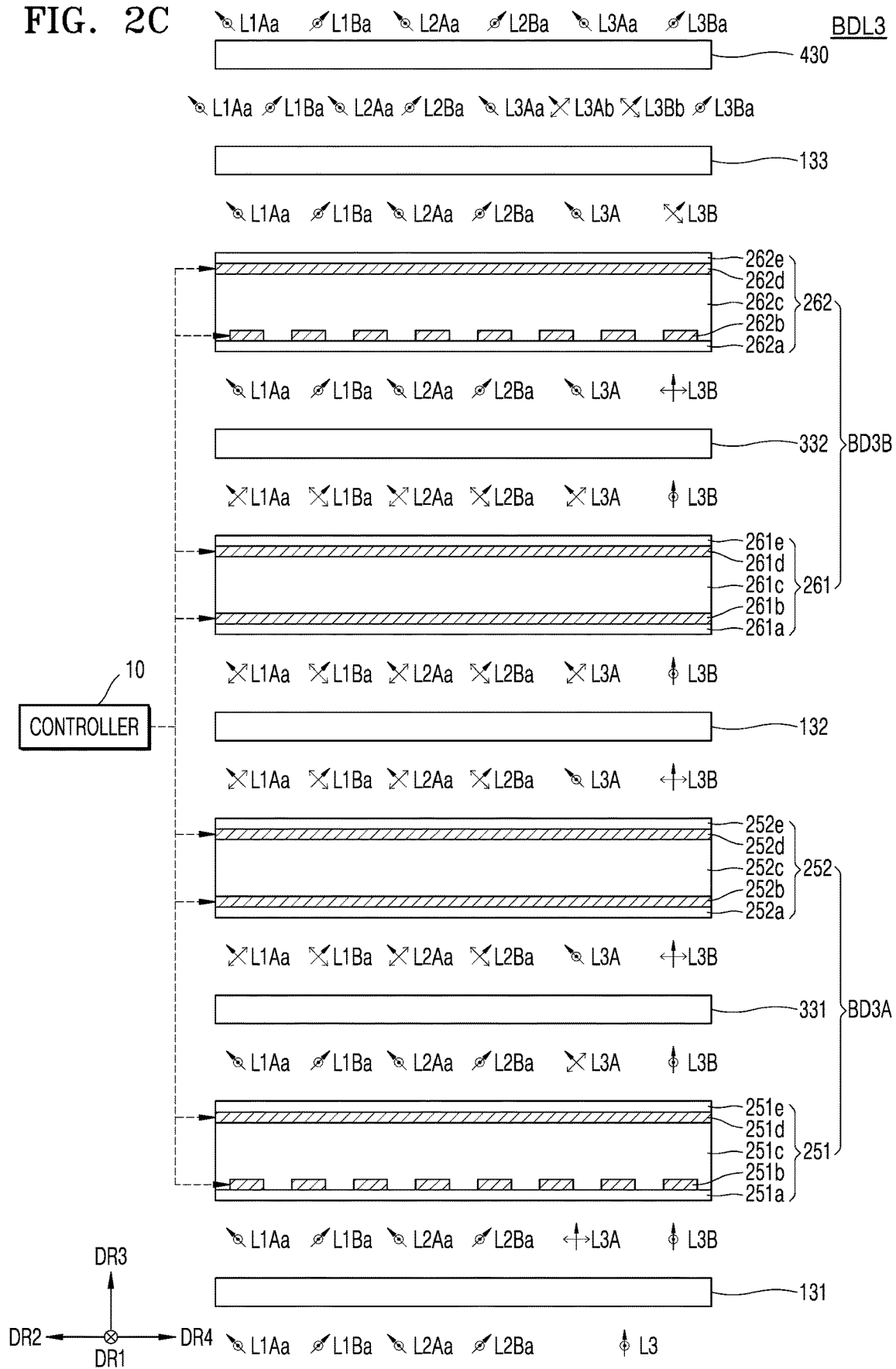
Figure 3A:
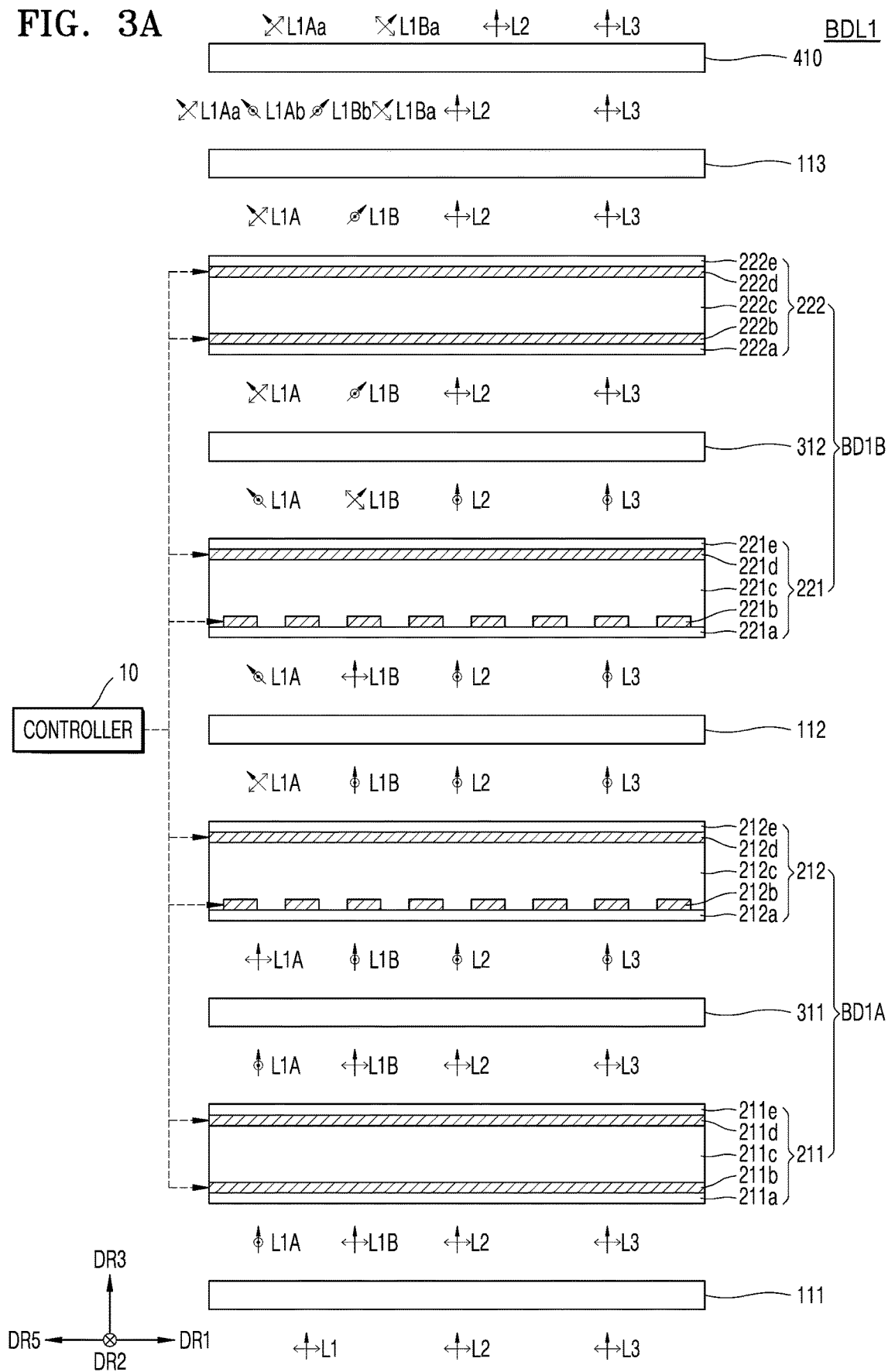
FIGS. 3A to 3C are conceptual diagrams in a second direction of the beam deflection layer of FIG. 1.
Figure 3B:
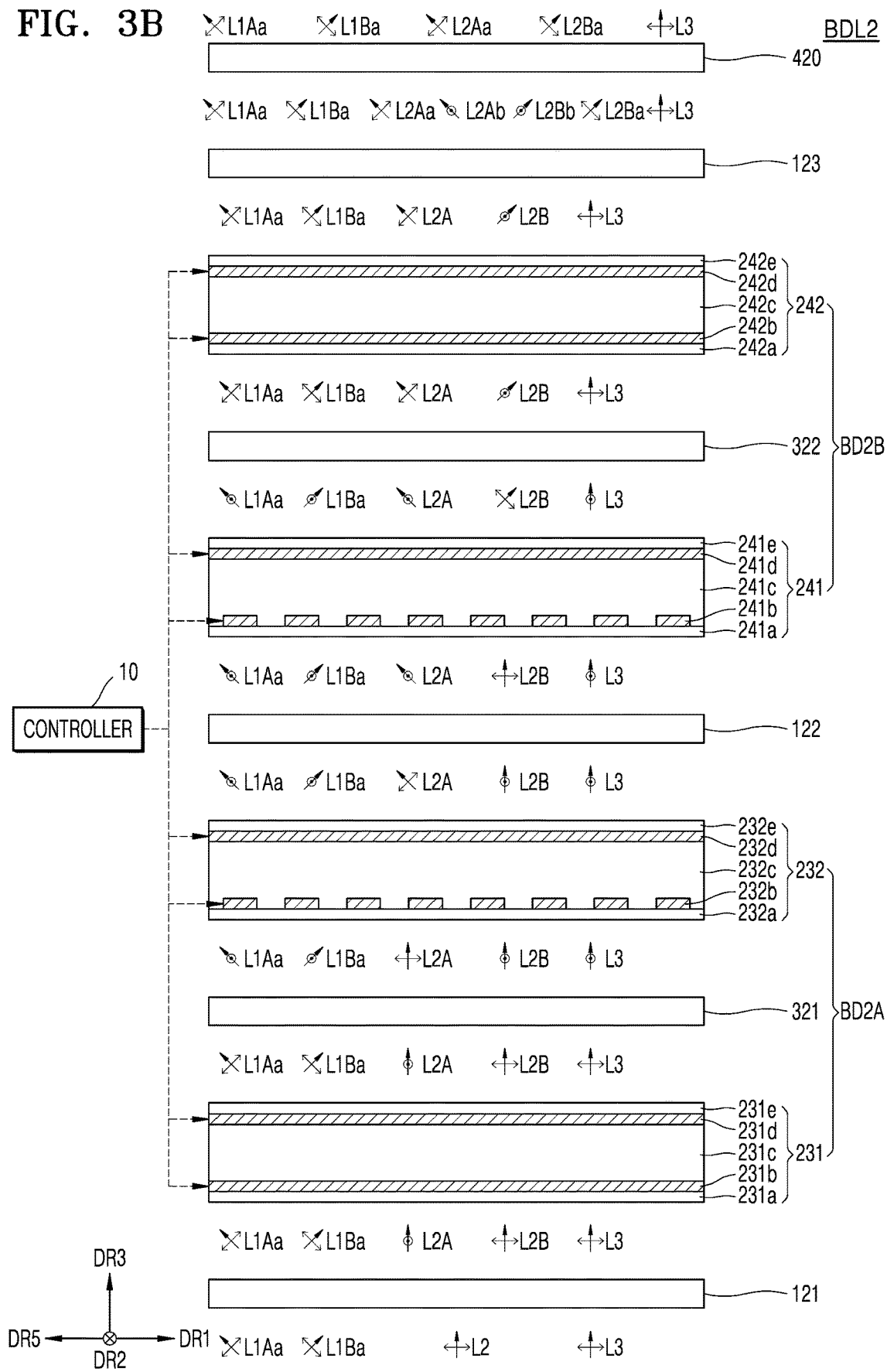
Figure 3C:
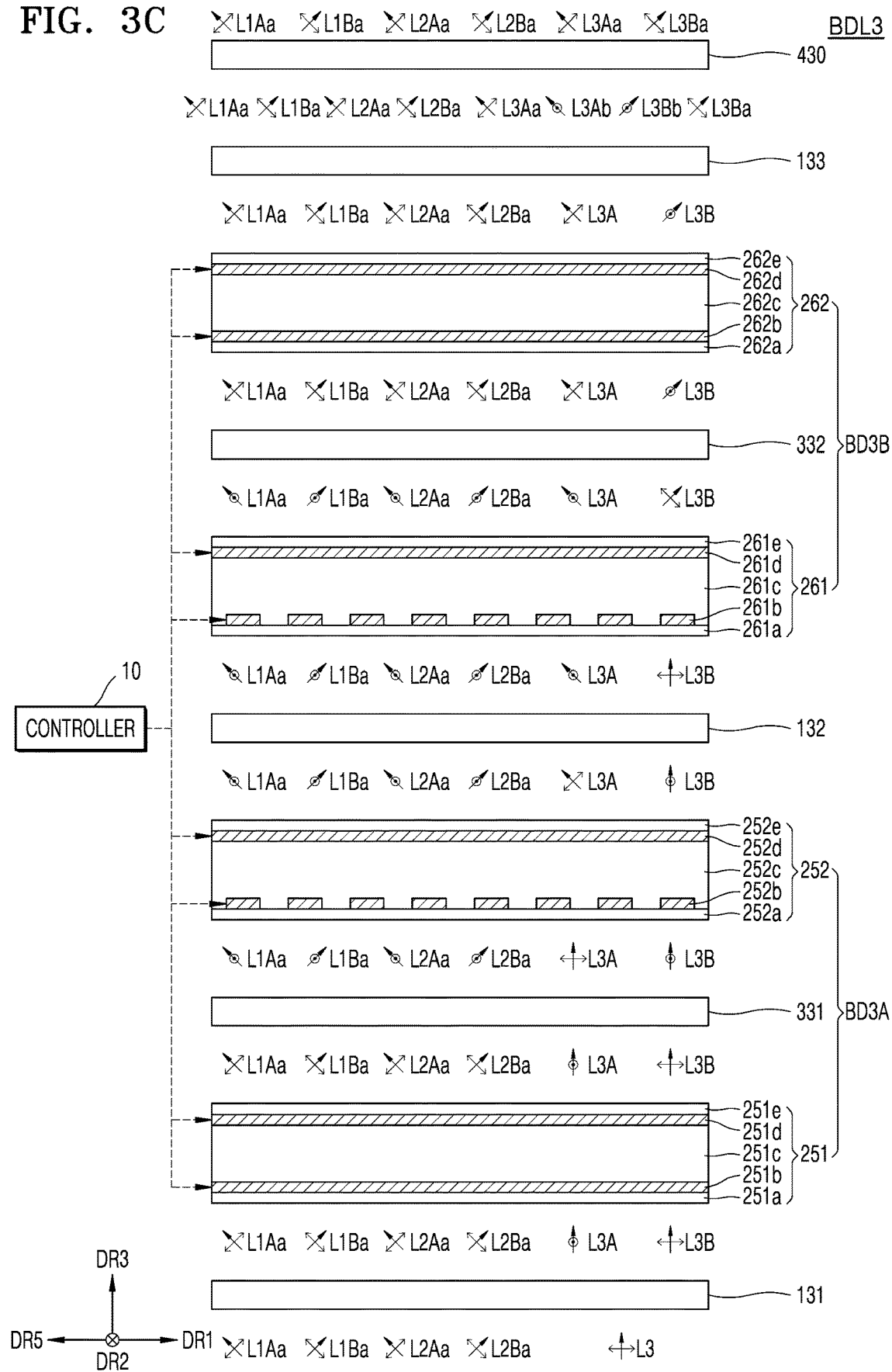

FIG. 1 is a conceptual diagram of a beam deflection layer 1 according to an example embodiment. FIGS. 2A to 2C are conceptual diagrams illustrating view in a first direction DR1 of the beam deflection layer 1 of FIG. 1. FIGS. 3A to 3C are conceptual diagrams illustrating view in a second direction DR2 of the beam deflection layer 1 of FIG. 1.

Referring to FIGS. 1, 2A to 2C and 3A to 3C, the beam deflection layer 1 may include a first sub-beam deflection layer BDL1, a second sub-beam deflection layer BDL2, a third sub-beam deflection layer BDL3, and a controller 10. The beam deflection layer 1 may receive an incident beam IB and emit a first emission beam OB1 and a second emission beam OB2. For instance, the first emission beam OB1 and the second emission beam OB2 are output beams. The beam deflection layer 1 may generate the first emission beam OB1 and the second emission beam OB2 by splitting and deflecting the incident beam IB. As such, the beam deflection layer 1 may control traveling directions of the first emission beam OB1 and the second emission beam OB2. Also, the beam deflection layer 1 may focus the first emission beam OB1 and the second emission beam OB2. For example, the beam deflection layer 1 may focus the first emission beam OB1 and the second emission beam OB2 in a desired direction. According to an example embodiment, splitting may include dividing or separating the light into two lights of different polarization. According to an example embodiment, deflecting may include changing the direction of the light.

A light beam IB may be incident on the first sub-beam deflection layer BDL1 in a third direction DR3 intersecting the first direction DR1 and the second direction DR2. The light beam IB may sequentially pass through the first sub-beam deflection layer BDL1, the second sub-beam deflection layer BDL2, and the third sub-beam deflection layer BDL3. The light beam IB may include a first color light L1 having a first wavelength band, a second color light L2 having a second wavelength band, and a third color light L3 having a third wavelength band. The light beam may be light in which the first color light L1, the second color light L2, and the third color light L3 are synthesized. The first wavelength band, the second wavelength band, and the third wavelength band may be different from each other. For example, the first color light L1, the second color light L2, and the third color light L3 respectively may have red, green, and blue colors.

Each of the first color light L1, the second color light L2, and the third color light L3 incident on the first sub-beam deflection layer BDL1 may have a first polarization direction ⊙ in FIG. 2A, 2B, and 2C or ↔ in FIG. 3A, 3B, and 3C. The first polarization direction ⊙ in FIG. 2A, 2B, and 2C or ↔ in FIG. 3A, 3B, and 3C may be parallel to the first direction DR1. The first color light L1, the second color light L2, and the third color light L3 may be incident on the first sub-beam deflection layer BDL1 in the third direction DR3. For example, the first direction DR1, the second direction DR2, and the third direction DR3 may be perpendicular to each other.

The first sub-beam deflection layer BDL1 may include a 1A selective polarization conversion-splitter 111, a 1A horizontal deflector 211, a 1A general-purpose polarization converter 311, a 1A vertical deflector 212, a first selective polarization converter 112, a 1B vertical deflector 221, a 1B general-purpose polarization converter 312, a 1B horizontal deflector 222, a 1B selective polarization conversion-splitter 113, and a first polarizer 410. According to an example embodiment, elements of the first sub-beam deflection layer BDL1 may be arranged in the third direction DR3 as illustrated in FIG. 2A. The first color light L1, the second color light L2, and the third color light L3 may sequentially pass through the 1A selective polarization conversion-splitter 111, the 1A horizontal deflector 211, the 1A general-purpose polarization converter 311, the 1A vertical deflector 212, the first selective polarization converter 112, the 1B vertical deflector 221, the 1B general-purpose polarization converter 312, the 1B horizontal deflector 222, the 1B selective polarization conversion-splitter 113, and the first polarizer 410.

The 1A selective polarization conversion-splitter 111 and the 1B selective polarization conversion-splitter 113 may have selectivity with respect to the first wavelength band. The 1A selective polarization conversion-splitter 111 and the 1B selective polarization conversion-splitter 113 may rotate the polarization direction of light in the first wavelength band by 45 degrees. For example, the 1A selective polarization conversion-splitter 111 and the 1B selective polarization conversion-splitter 113 may include an optically anisotropic polymer or inorganic material having wavelength selectivity with respect to the first wavelength band. When light in the first wavelength band before polarization conversion has a polarization direction of x degrees, light in the first wavelength band after polarization conversion may have a polarization direction of x+45 degrees. Light in the first wavelength band having a polarization direction of x+45 degrees may be a synthetic light in the wavelength band having a polarization direction of x degrees and light in the wavelength band having a polarization direction of x+90 degrees. At this point, light in the first wavelength band having a polarization direction of x degrees and light in the first wavelength band having a polarization direction of x+90 degrees may have the same phase. Rotation by 45 degrees of the polarization direction of light having an arbitrary polarization direction may substantially be the same as splitting of light into light having an arbitrary polarization direction and light having a polarization direction rotated by 90 degrees from the arbitrary polarization direction. For example, the 1A selective polarization conversion-splitter 111 and the 1B selective polarization conversion-splitter 113 may split light in a first wavelength band having a first polarization direction ⊙ in FIG. 2A, 2B, and 2C into light in a first wavelength band having a first polarization direction ⊙ in FIG. 2A, 2B, and 2C and light in a first wavelength band having a second polarization direction ↔ in FIG. 2A, 2B, and 2C.

Moreover, the 1A selective polarization conversion-splitter 111 and the 1B selective polarization conversion-splitter 113 may split light in a first wavelength band having a first polarization direction ↔ in FIG. 3A, 3B, and 3C into light in a first wavelength band having a first polarization direction ↔ in FIG. 3A, 3B, and 3C and light in a first wavelength band having a second polarization direction ⊙ in FIG. 3A, 3B, and 3C.

However, splitting light in the first wavelength band may denote splitting a polarization direction not spatial splitting. The light in the first wavelength band having a split first polarization direction ⊙ in FIG. 2A, 2B, and 2C and the light in the first wavelength band having a second polarization direction ↔ in FIG. 2A, 2B, and 2C may have the same wavelength band (i.e., the first wavelength band) and the same phase. The light in the first wavelength band having a split first polarization direction ↔ in FIG. 3A, 3B, and 3C and the light in the first wavelength band having a second polarization direction ⊙ in FIG. 3A, 3B, and 3C may have the same wavelength band (i.e., the first wavelength band) and the same phase. The 1A selective polarization conversion-splitter 111 and the 1B selective polarization conversion-splitter 113 may maintain the polarization directions of a second color light L2 having a second wavelength band and a third color light L3 having a third wavelength band.

The first selective polarization converter 112 may have selectivity with respect to the first wavelength band. The first selective polarization converter 112 may rotate the polarization direction of light in the first wavelength band by 90 degrees. For example, the first selective polarization converter 112 may include an optically anisotropic polymer or inorganic material having wavelength selectivity with respect to the first wavelength band. The first selective polarization converter 112 may change the polarization direction of light in the first wavelength band from a first polarization direction ⊙ in FIG. 2A, 2B, and 2C to a second polarization direction ↔ in FIG. 2A, 2B, and 2C or from the second polarization direction ↔ in FIG. 2A, 2B, and 2C to the first polarization direction ⊙ in FIG. 2A, 2B, and 2C. The first selective polarization converter 112 may change the polarization direction of light in the first wavelength band from a first polarization direction ↔ in FIG. 3A, 3B, and 3C to a second polarization direction ⊙ in FIG. 3A, 3B, and 3C or from the second polarization direction ⊙ in FIG. 3A, 3B, and 3C to the first polarization direction ↔ in FIG. 3A, 3B, and 3C. The first selective polarization converter 112 may maintain polarization directions of the second color light L2 having a second wavelength band and the third color light L3 having a third wavelength band. That is, the first selective polarization converter 112 may only change the polarization directions of the first color light L1 having the first wavelength band, while maintain the polarization directions of the other color lights in the other wavelength bands.

The 1A vertical deflector 212 and the 1B vertical deflector 221 may vertically deflect light having a first polarization direction ⊙ in FIG. 2A, 2B, and 2C or ↔ in FIG. 3A, 3B, and 3C. Hereinafter, the vertical deflection may refer to deflection in a first direction DR1 or a fifth direction DR5 opposite to the first direction DR1. The 1A horizontal deflector 211 and the 1B horizontal deflector 222 may horizontally deflect light having the first polarization direction ⊙ in FIG. 2A, 2B, and 2C or ↔ in FIG. 3A, 3B, and 3C. Hereinafter, the horizontal deflection may refer to the deflection in the second direction DR2 or a fourth direction DR4 opposite to the second direction DR2.

Each of the 1A horizontal deflector 211, the 1B horizontal deflector 222, the 1A vertical deflector 212, and the 1B vertical deflector 221 may respectively include lower substrates 211a, 212a, 221a, and 222a, lower electrodes 211b, 212b, 221b, and 222b, upper electrode layers 211d, 212d, 221d, and 222d, upper substrates 211e, 212e, 221e, and 222e, and liquid crystal layers 211c, 212c, 221c, and 222c. The 1A horizontal deflector 211 and the 1B horizontal deflector 222 may be substantially the same to each other. The 1A horizontal deflector 211 and the 1B horizontal deflector 222 may be different from the 1A vertical deflector 212 and the 1B vertical deflector 221 with respect to the arrangement direction of the lower electrodes 211b, 212b, 221b, and 222b.

According to an example embodiment, the lower substrates 211a, 212a, 221a, and 222a and the upper substrates 211e, 212e, 221e, and 222e may include an insulating material. For example, the lower substrates 211a, 212a, 221a, and 222a and the upper substrates 211e, 212e, 221e, and 222e may include glass or transparent plastic. The lower substrates 211a, 212a, 221a, and 222a and the upper substrates 211e, 212e, 221e, and 222e may face each other.

The lower electrodes 211b, 212b, 221b, and 222b may be provided on the lower substrates 211a, 212a, 221a, and 222a. For example, the lower electrodes 211b, 212b, 221b, and 222b may be disposed on upper surfaces of the lower substrates 211a, 212a, 221a, and 222a. The lower electrodes 211b of the 1A horizontal deflector 211 and the lower electrodes 222b of the 1B horizontal deflector 222 may be arranged in a direction parallel to the second deflection direction. For example, the lower electrodes 211b of the 1A horizontal deflector 211 and the lower electrodes 222b of the 1B horizontal deflector 222 may be arranged in the second direction DR2.

The lower electrodes 212b of the 1A vertical deflector 212 and the lower electrodes 221b of the 1B vertical deflector 221 may be arranged in a direction parallel to the first deflection direction. For example, the lower electrodes 212b of the 1A vertical deflector 212 and the lower electrodes 221b of the 1B vertical deflector 221 may be arranged in the first direction DR1. The lower electrodes 211b, 212b, 221b, and 222b may include a transparent conductive material. For example, the lower electrodes 211b, 212b, 221b, and 222b may include indium-tin-oxide (ITO), indium-zinc-oxide (IZO), indium-tin-zinc-oxide (ITZO), or a combination of these materials. Driving voltages may be applied to the lower electrodes 211b, 212b, 221b, and 222b by the controller 10, respectively. The magnitudes and polarities of the driving voltages may be independently controlled by the controller 10.

The upper electrode layers 211d, 212d, 221d, and 222d may be provided under the upper substrates 211e, 212e, 221e, and 222e. For example, the upper electrode layers 211d, 212d, 221d, and 222d may be disposed on the bottom surface of the upper substrates 211e, 212e, 221e, and 222e. The upper electrode layers 211d, 212d, 221d, and 222d may face the lower electrodes 211b, 212b, 221b, and 222b, respectively. For example, the upper electrode layer may be a single electrode layer. The upper electrode layers 211d, 212d, 221d, and 222d may include a transparent conductive material. For example, the upper electrode layers 211d, 212d, 221d, and 222d may include indium-tin-oxide (ITO), indium-zinc-oxide (IZO), indium-tin-zinc-oxide (ITZO), or a combination of these materials. A common voltage may be applied to the upper electrode layers 211d, 212d, 221d, and 222d by the controller 10. The magnitude and polarity of the common voltage may be controlled by the controller 10.

The liquid crystal layers 211c, 212c, 221c, and 222c may be provided between the lower electrodes 211b, 212b, 221b, and 222b and the upper electrode layers 211d, 212d, 221d, and 222d. In one example, the liquid crystal layers 211c, 212c, 221c, and 222c may fill regions between the lower electrodes 211b, 212b, 221b, and 222b. The liquid crystal layers 211c, 212c, 221c, and 222c may include liquid crystal molecules. The liquid crystal molecules may create an optical path conversion surface in the liquid crystal layer. The optical path conversion surface may be an interface where the change of refractive index occurs in the liquid crystal layer. The optical path conversion surface may be formed as the arrangement of liquid crystal molecules changes due to a voltage difference between the lower electrodes 211b, 212b, 221b, and 222b and the upper electrode layers 211d, 212d, 221d, and 222d. Since the refractive index is changed based on the optical path conversion surface, light may be refracted while passing through the optical path conversion surface. The light path conversion surface is formed because the refractive index in a long axis direction of the liquid crystal molecules is different from the refractive index in a short axis direction. In other words, when light is incident on liquid crystal molecules, the liquid crystal molecules may exhibit different refractive indices from each other with respect to light having polarization parallel to the long axis direction and light having polarization parallel to a direction perpendicular to the long axis direction.

According to an example embodiment, a shape or a slope of the light path conversion surface may be determined by driving voltages applied to the lower electrodes 211b, 212b, 221b, and 222b. The lower electrodes 211b of the 1A horizontal deflector 211 and the lower electrodes 222b of the 1B horizontal deflector 222 may form an optical path conversion surface that refracts light having a second polarization direction ↔ in FIG. 2A, 2B, and 2C or refracts light having a second polarization direction ⊙ in FIG. 3A, 3B, and 3C in the liquid crystal layer. Light having the second polarization direction ↔ in FIG. 2A, 2B, and 2C or ⊙ in FIG. 3A, 3B, and 3C may be horizontally deflected by the light path conversion surfaces formed in the 1A horizontal deflector 211 and the 1B horizontal deflector 222. The lower electrodes 212b of the 1A vertical deflector 212 and the lower electrodes 221b of the 1B vertical deflector 221 may form an optical path conversion surface that refracts light having the first polarization direction ⊙ in FIG. 2A, 2B, and 2C or refracts light having the first polarization direction ↔ in FIG. 3A, 3B, and 3C in the liquid crystal layer. Light having a second polarization direction ↔ in FIG. 2A, 2B, and 2C or ⊙ in FIG. 3A, 3B, and 3C may be horizontally deflected by the optical path conversion surface formed in the 1A vertical deflector 212 and the 1B vertical deflector 221. Since driving voltages are controlled by the controller 10, the shape or slope of the light path conversion surface may be controlled by the controller 10.

The 1A general-purpose polarization converter 311 and the 1B general-purpose polarization converter 312 may convert polarization directions of light incident on the 1A general-purpose polarization converter 311 and the 1B general-purpose polarization converter 312. The 1A general-purpose polarization converter 311 and the 1B general-purpose polarization converter 312 may not have selectivity with respect to a wavelength band of light. That is, the 1A general-purpose polarization converter 311 and the 1B general-purpose polarization converter 312 may change the polarization direction regardless of the type of a wavelength band of light, i.e., the change is not based on the type of a wavelength band of light. For example, the 1A general-purpose polarization converter 311 and the 1B general-purpose polarization converter 312 may change the polarization direction of light having the first polarization direction ⊙ in FIG. 2A, 2B, and 2C to the second polarization direction ↔ in FIG. 2A, 2B, and 2C and may change the polarization direction of light having the second polarization direction ↔ in FIG. 2A, 2B, and 2C to the first polarization direction among light beams incident on the 1A general-purpose polarization converter 311 and the 1B general-purpose polarization converter 312. Further, the 1A general-purpose polarization converter 311 and the 1B general-purpose polarization converter 312 may change the polarization direction of light having the first polarization direction ↔ in FIG. 3A, 3B, and 3C to the second polarization direction ⊙ in FIG. 3A, 3B, and 3C and may change the polarization direction of light having the second polarization direction ⊙ in FIG. 3A, 3B, and 3C to the first polarization direction among light beams incident on the 1A general-purpose polarization converter 311 and the 1B general-purpose polarization converter 312. For example, the 1A general-purpose polarization converter 311 and the 1B general-purpose polarization converter 312 may include a half wave plate.

The first polarizer 410 may transmit only light having a first polarization direction ⊙ in FIG. 2A, 2B, and 2C or ↔ in FIG. 3A, 3B, and 3C among light beams incident on the first polarizer 410. When a light beam incident on the first polarizer 410 has a second polarization direction ↔ in FIG. 2A, 2B, and 2C perpendicular to the first polarization direction ⊙ in FIG. 2A, 2B, and 2C, the light may not have a component having the first polarization direction ⊙ in FIG. 2A, 2B, and 2C. Also, when a light beam incident on the first polarizer 410 has a second polarization direction ⊙ in FIG. 3A, 3B, and 3C perpendicular to the first polarization direction ↔ in FIG. 3A, 3B, and 3C, the light may not have a component having the first polarization direction ↔ in FIG. 3A, 3B, and 3C. Accordingly, light having the second polarization direction ↔ in FIG. 2A, 2B, and 2C or ⊙ in FIG. 3A, 3B, and 3C may be blocked by the first polarizer 410.

Hereinafter, a process in which a light beam passes through the first sub-beam deflection layer BDL1 will be described.

A light beam including the first color light L1, the second color light L2, and the third color light L3 may enter the 1A selective polarization conversion-splitter 111. The first color light L1, the second color light L2, and the third color light L3 may have a first polarization direction ⊙ in FIG. 2A, 2B, and 2C or ↔ in FIG. 3A, 3B, and 3C.

The 1A selective polarization conversion-splitter 111 may split the first color light L1 having a first wavelength band into 1A color light L1A having a second polarization direction ↔ in FIG. 2A, 2B, and 2C and 1B color light L1B having a first polarization direction ⊙ in FIG. 2A, 2B, and 2C. Also, the 1A selective polarization conversion-splitter 111 may split the first color light L1 having a first wavelength band into 1A color light L1A having a second polarization direction ⊙ in FIG. 3A, 3B, and 3C and 1B color light L1B having a first polarization direction ↔ in FIG. 3A, 3B, and 3C. The 1A selective polarization conversion-splitter 111 may maintain the polarization directions of the second color light L2 and the third color light L3 in the first polarization direction ⊙ in FIG. 2A, 2B, and 2C or ↔ in FIG. 3A, 3B, and 3C. The 1A selective polarization conversion-splitter 111 may provide the 1A color light L1A, the 1B color light L1B, the second color light L2, and the third color light L3 to the 1A horizontal deflector 211.

The 1A horizontal deflector 211 may horizontally deflect the 1A color light L1A having the second polarization direction ↔ in FIG. 2A, 2B, and 2C or ⊙ in FIG. 3A, 3B, and 3C. For example, the 1A color light L1A may be deflected in the second direction DR2 by the 1A horizontal deflector 211. The 1A horizontal deflector 211 may provide the 1A color light L1A, the 1B color light L1B, the second color light L2, and the third color light L3 to the 1A general-purpose polarization converter 311.

The 1A general-purpose polarization converter 311 may change polarization directions of the 1A color light L1A, the 1B color light L1B, the second color light L2, and the third color light L3. For example, the 1A general-purpose polarization converter 311 may change the polarization directions of the 1B color light L1B, the second color light L2, and the third color light L3 from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the 1A general-purpose polarization converter 311 may change the polarization direction of the 1A color light L1A from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The 1A general-purpose polarization converter 311 may provide the 1A color light L1A, the 1B color light L1B, the second color light L2, and the third color light L3 to the 1A vertical deflector 212.

The 1A vertical deflector 212 may vertically deflect the 1A color light L1A having the first polarization direction ⊙ in FIG. 2A, 2B, and 2C or ↔ in FIG. 3A, 3B, and 3C. For example, the 1A color light L1A may be deflected in the first direction DR1 by the 1A vertical deflector 212. The 1A vertical deflector 212 may provide the 1A color light L1A, the 1B color light L1B, the second color light L2, and the third color light L3 to the first selective polarization converter 112.

The first selective polarization converter 112 may change polarization directions of the 1A color light L1A and 1B color light L1B having a first wavelength band. For example, the first selective polarization converter 112 may change the polarization direction of the 1A color light L1A from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the first selective polarization converter 112 may change the polarization direction of the first B color light L1B from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The first selective polarization converter 112 may maintain the polarization directions of the second color light L2 and the third color light L3 in the second polarization direction ↔ in FIG. 2A, 2B, and 2C or ⊙ in FIG. 3A, 3B, and 3C. The first selective polarization converter 112 may provide the 1A color light L1A, the 1B color light L1B, the second color light L2, and the third color light L3 to the 1B vertical deflector 221.

The 1B vertical deflector 221 may vertically deflect the 1B color light L1B having the first polarization direction ⊙ in FIG. 2A, 2B, and 2C or ↔ in FIG. 3A, 3B, and 3C. For example, the 1B color light L1B may be deflected in the fifth direction DR5 by the 1B vertical deflector 221. The 1B vertical deflector 221 may provide the 1A color light L1A, the 1B color light L1B, the second color light L2, and the third color light L3 to the 1B general-purpose polarization converter 312.

The 1B general-purpose polarization converter 312 may change polarization directions of the 1A color light L1A, the 1B color light L1B, the second color light L2, and the third color light L3. For example, the 1B general-purpose polarization converter 312 may change polarization directions of the first A color light L1A, the second color light L2, and the third color light L3 from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. For example, the 1B general-purpose polarization converter 312 may change the polarization direction of the 1B color light L1B from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. The 1B general-purpose polarization converter 312 may provide the 1A color light L1A, the 1B color light L1B, the second color light L2, and the third color light L3 to the 1B horizontal deflector 222.

The 1B horizontal deflector 222 may horizontally deflect the 1B color light L1B having the second polarization direction ↔ in FIG. 2A, 2B, and 2C or ⊙ in FIG. 3A, 3B, and 3C. For example, the 1B color light L1B may be deflected in the fourth direction DR4 by the 1B horizontal deflector 222. The 1B horizontal deflector 222 may provide the 1A color light L1A, the 1B color light L1B, the second color light L2, and the third color light L3 to a 1B selective polarization conversion-splitter 113.

The 1B selective polarization conversion-splitter 113 may split the 1A color light L1A having a first wavelength band into 1Aa color light L1Aa having a first polarization direction ⊙ in FIG. 2A, 2B, and 2C or ↔ in FIG. 3A, 3B, and 3C and 1Ab color light L1Ab having a second polarization direction in FIG. 2A, 2B, and 2C or ⊙ in FIG. 3A, 3B, and 3C. The 1B selective polarization conversion-splitter 113 may split the 1B color light L1B having a first wavelength band into 1Ba color light L1Ba having a first polarization direction ⊙ in FIG. 2A, 2B, and 2C or ↔ in FIG. 3A, 3B, and 3C and 1Bb color light L1Bb having a second polarization direction ↔ in FIG. 2A, 2B, and 2C or ⊙ in FIG. 3A, 3B, and 3C. The 1B selective polarization conversion-splitter 113 may maintain the polarization directions of the second color light L2 and the third color light L3 in the first polarization direction ⊙ in FIG. 2A, 2B, and 2C or ↔ in FIG. 3A, 3B, and 3C. The 1B selective polarization conversion-splitter 113 may provide the 1Aa color light L1Aa, the 1Ab color light L1Ab, the 1Ba color light L1Ba, the 1Bb color light L1Bb, and the second color light L2, and the third color light L3 to the first polarizer 410.

The first polarizer 410 may transmit light having a first polarization direction. For example, the first polarizer 410 may transmit the 1Aa color light L1Aa, the 1Ba color light L1Ba, the second color light L2, and the third color light L3.

The first sub-beam deflection layer BDL1 may split the first color light L1 into 1Aa color light L1Aa and 1Ba color light L1Ba that are deflected in different directions from each other. The first sub-beam deflection layer BDL1 may not deflect the second color light L2 and the third color light L3.

The second sub-beam deflection layer BDL2 may include a 2A selective polarization conversion-splitter 121, a 2A horizontal deflector 231, a 2A general-purpose polarization converter 321, and a 2A vertical deflector 232, a 2nd selective polarization converter 122, a 2B vertical deflector 241, a 2B general-purpose polarization converter 322, a 2B horizontal deflector 242, a 2B selective polarization conversion-splitter 123, and a second polarizer 420. Constituent elements of the second sub-beam deflection layer BDL2 may be arranged in the third direction DR3. The 1Aa color light L1Aa, the 1Ba color light L1Ba, the second color light L2, and the third color light L3 may sequentially pass through the 2A selective polarization conversion-splitter 121, the 2A horizontal deflector 231, the 2A general-purpose polarization converter 321, the 2A vertical deflector 232, the 2nd selective polarization converter 122, the 2B vertical deflector 241, the 2B general-purpose polarization converter 322, the 2B horizontal deflector 242, the 2B selective polarization conversion-splitter 123, and the second polarizer 420

The 2A horizontal deflector 231, the 2A general-purpose polarization converter 321, the 2A vertical deflector 232, the 2B vertical deflector 241, the 2B general-purpose polarization converter 322, the 2B horizontal deflector 242, and the second polarizer 420 respectively may be substantially the same as the 1A horizontal deflector 211, the 1A general-purpose polarization converter 311, the 1A vertical deflector 212, the 1B vertical deflector 221, the 1B general-purpose polarization converter 312, the 1B horizontal deflector 222, and the first polarizer 410 described above. For brevity of explanation, the descriptions of the 2A horizontal deflector 231, the 2A general-purpose polarization converter 321, the 2A vertical deflector 232, the 2B vertical deflector 241, and the 2B general-purpose polarization converter 322, the 2B horizontal deflector 242, and the second polarizer 420 are omitted.

The 2A selective polarization conversion-splitter 121 and the 2B selective polarization conversion-splitter 123 may have selectivity with respect to a second wavelength band. The 2A selective polarization conversion-splitter 121 and the 2B selective polarization conversion-splitter 123 may rotate the polarization direction of light in the second wavelength band by 45 degrees. For example, the 2A selective polarization conversion-splitter 121 and the 2B selective polarization conversion-splitter 123 may include an optically anisotropic polymer or inorganic material having wavelength selectivity with respect to a second wavelength band. For example, the 2A selective polarization conversion-splitter 121 and the 2B selective polarization conversion-splitter 123 may split light in the second wavelength band having the first polarization direction ⊙ in FIG. 2A, 2B, and 2C or ↔ in FIG. 3A, 3B, and 3C into light in the second wavelength band having a first polarization direction ⊙ in FIG. 2A, 2B, and 2C or ↔ in FIG. 3A, 3B, and 3C and light in the second wavelength band having a second polarization direction ↔ in FIG. 2A, 2B, and 2C or ⊙ in FIG. 3A, 3B, and 3C. However, splitting light in the second wavelength band may denote splitting in a polarization direction not spatial splitting. The light in the second wavelength band having a split first polarization direction ⊙ in FIG. 2A, 2B, and 2C or ↔ in FIG. 3A, 3B, and 3C and the light in the second wavelength band having the second polarization direction ↔ in FIG. 2A, 2B, and 2C or ⊙ in FIG. 3A, 3B, and 3C may have the same wavelength band (i.e., the second wavelength band) and the same phase. The 2A selective polarization conversion-splitter 121 and the 2B selective polarization conversion-splitter 123 may maintain polarization directions of the 1Aa color light L1Aa and the 1Ba color light L1Ba having a first wavelength band and the third color light L3 having a third wavelength band.

The second selective polarization converter 122 may have selectivity with respect to the second wavelength band. The second selective polarization converter 122 may rotate the polarization direction of light in the second wavelength band by 90 degrees. For example, the second selective polarization converter 122 may include an optically anisotropic polymer or inorganic material having wavelength selectivity with respect to the second wavelength band. The second selective polarization converter 122 may change the polarization direction of light in the second wavelength band from a first polarization direction ⊙ in FIG. 2A, 2B, and 2C or ↔ in FIG. 3A, 3B, and 3C to a second polarization direction ↔ in FIG. 2A, 2B, and 2C or ⊙ in FIG. 3A, 3B, and 3C or from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The second selective polarization converter 122 may maintain polarization directions of the 1Aa color light L1Aa and the 1Ba color light L1Ba having a first wavelength band and the third color light L3 having a third wavelength band.

Hereinafter, a process in which a light beam passes through the second sub-beam deflection layer BDL2 will be described.

A light beam including the 1Aa color light L1Aa, the 1Ba color light L1Ba, the second color light L2, and the third color light L3 may enter the 2A selective polarization conversion-splitter 121. The 1Aa color light L1Aa, the 1Ba color light L1Ba, the second color light L2, and the third color light L3 may have a first polarization direction ⊙ in FIG. 2A, 2B, and 2C or ↔ in FIG. 3A, 3B, and 3C.

The 2A selective polarization conversion-splitter 121 may split the second color light L2 having a second wavelength band into 2A color light L2A having a second polarization direction ↔ in FIG. 2A, 2B, and 2C or ⊙ in FIG. 3A, 3B, and 3C and 2B color light L2B having a first polarization direction ⊙ in FIG. 2A, 2B, and 2C or ↔ in FIG. 3A, 3B, and 3C. The 2A selective polarization conversion-splitter 121 may maintain polarization directions of the 1Aa color light L1Aa, the 1Ba color light L1Ba, and the third color light L3 in the first polarization direction ⊙ in FIG. 2A, 2B, and 2C or ↔ in FIG. 3A, 3B, and 3C. The 2A selective polarization conversion-splitter 121 may provide the 1Aa color light L1Aa, the 1Ba color light L1Ba, the 2A color light L2A, the 2B color light L2B, and third color light L3 to the 2A horizontal deflector 231.

The 2A horizontal deflector 231 may horizontally deflect the 2A color light L2A having the second polarization direction ↔ in FIG. 2A, 2B, and 2C or ⊙ in FIG. 3A, 3B, and 3C. For example, the 2A color light L2A may be deflected in the second direction DR2 by the 2A horizontal deflector 231. The 2A horizontal deflector 231 may provide the 1Aa color light L1Aa, the 1Ba color light L1Ba, the 2A color light L2A, the 2B color light L2B, and the third color light L3 to the 2A general-purpose polarization converter 321.

The 2A general-purpose polarization converter 321 may change polarization directions of the 1Aa color light L1Aa, the 1Ba color light L1Ba, the 2A color light L2A, the 2B color light L2B, and the third color light L3. For example, the 2A general-purpose polarization converter 321 may change the polarization directions of the 1Aa color light L1Aa, the 1Ba color light L1Ba, the 2B color light L2B, and the third color light L3 from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the 2A general-purpose polarization converter 321 may change the polarization direction of the 2A color light L2A from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The 2A general-purpose polarization converter 321 may provide the 1Aa color light L1Aa, the 1Ba color light L1Ba, the 2A color light L2A, the 2B color light L2B, and the third color light L3 to the 2A vertical deflector 232.

The 2A vertical deflector 232 may vertically deflect the 2A color light L2A having the first polarization direction ⊙ in FIG. 2A, 2B, and 2C or ↔ in FIG. 3A, 3B, and 3C. For example, the 2A color light L2A may be deflected in the first direction DR1 by the 2A vertical deflector 232. The 2A vertical deflector 232 may provide the 1Aa color light L1Aa, the 1Ba color light L1Ba, the 2A color light L2A, the 2B color light L2B, and the third color light L3 to the second selective polarization converter 122.

The second selective polarization converter 122 may change polarization directions of the 2A color light L2A and the 2B color light L2B having a second wavelength band. For example, the second selective polarization converter 122 may change the polarization direction of the 2A color light L2A from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the second selective polarization converter 122 may change the polarization direction of the 2B color light L2B from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The second selective polarization converter 122 may maintain the polarization directions of the first Aa color light L1Aa, the first Ba color light L1Ba, and the third color light L3 in the second polarization direction ↔ in FIG. 2A, 2B, and 2C or ⊙ in FIG. 3A, 3B, and 3C. The second selective polarization converter 122 may provide the 1Aa color light L1Aa, the 1Ba color light L1Ba, the 2A color light L2A, the 2B color light L2B, and the third color light L3 to the 2B vertical deflector 241.

The 2B vertical deflector 241 may vertically deflect the 2B color light L2B having the first polarization direction ⊙ in FIG. 2A, 2B, and 2C or ↔ in FIG. 3A, 3B, and 3C. For example, the 2B color light L2B may be deflected in the fifth direction DR5 by the 2B vertical deflector 241. The 2B vertical deflector 241 may provide the 1Aa color light L1Aa, the 1Ba color light L1Ba, the 2A color light L2A, the 2B color light L2B, and the third color light L3 to the 2B general-purpose polarization converter 322.

The 2B general-purpose polarization converter 322 may change polarization directions of the 1Aa color light L1Aa, 1Ba color light L1Ba, 2A color light L2A, 2B color light L2B, and third color light L3. For example, the 2B general-purpose polarization converter 322 may change polarization directions of the 1Aa color light L1Aa, the 1Ba color light L1Ba, the 2A color light L2A, and the third color light L3 from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. For example, the 2B general-purpose polarization converter 322 may change the polarization direction of the 2B color light L2B from first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. The 2B general-purpose polarization converter 322 may provide the 1Aa color light L1Aa, the 1Ba color light L1Ba, the 2A color light L2A, the 2B color light L2B, and the third color light L3 to the 2B horizontal deflector 242.

The 2B horizontal deflector 242 may horizontally deflect the 2B color light L2B having the second polarization direction ↔ in FIG. 2A, 2B, and 2C or ⊙ in FIG. 3A, 3B, and 3C. For example, the 2B color light L2B may be deflected in the fourth direction DR4 by the 2B horizontal deflector 242. The 2B horizontal deflector 242 may provide the 1Aa color light L1Aa, the 1Ba color light L1Ba, the 2A color light L2A, the 2B color light L2B, and the third color light L3 to the 2B selective polarization conversion-splitter 123.

The 2B selective polarization conversion-splitter 123 may split the 2A color light L2A having a second wavelength band into 2Aa color light L2Aa having the first polarization direction ⊙ in FIG. 2A, 2B, and 2C or ↔ in FIG. 3A, 3B, and 3C and 2Ab color light L2Ab having the second polarization direction ↔ in FIG. 2A, 2B, and 2C or ⊙ in FIG. 3A, 3B, and 3C. The 2B selective polarization conversion-splitter 123 may split the 2B color light L2B having the second wavelength band into 2Ba color light L2Ba having the first polarization direction ⊙ in FIG. 2A, 2B, and 2C or ↔ in FIG. 3A, 3B, and 3C and 2Bb color light L2Bb having the second polarization direction ↔ in FIG. 2A, 2B, and 2C or ⊙ in FIG. 3A, 3B, and 3C. The 2B selective polarization conversion-splitter 123 may maintain the polarization directions of the 1Aa color light L1Aa, the 1Ba color light L1Ba, and the third color light L3 in the first polarization direction ⊙ in FIG. 2A, 2B, and 2C or ↔ in FIG. 3A, 3B, and 3C. The 2B selective polarization conversion-splitter 123 may provide the 1Aa color light L1Aa, the 1Ba color light L1Ba, the 2Aa color light L2Aa, the 2Ab color light L2Ab, the 2Ba color light L2Ba, the 2Bb color light L2Bb, and the third color light L3 to the second polarizer 420.

The second polarizer 420 may transmit light having a first polarization direction. For example, the second polarizer 420 may transmit the 1Aa color light L1Aa, the 1Ba color light L1Ba, the 2Aa color light L2Aa, the 2Ba color light L2Ba, and the third color light L3.

The second sub-beam deflection layer BDL2 may split the second color light L2 into the 2Aa color light L2Aa and the 2Ba color light L2Ba that are deflected in different directions from each other. The second sub-beam deflection layer BDL2 may not deflect the 1Aa color light L1Aa, the 1Ba color light L1Ba, and the third color light L3. The traveling directions of the 1Aa color light L1Aa and the 2Aa color light L2Aa may be substantially the same. The traveling directions of the 1Ba color light L1Ba and the second Ba color light L2Ba may be substantially the same.

The third sub-beam deflection layer (BDL3) may include a 3A selective polarization conversion-splitter 131, a 3A horizontal deflector 251, a 3A general-purpose polarization converter 331, a 3A vertical deflector 252, a 3rd selective polarization converter 132, a 3B vertical deflector 261, a 3B general-purpose polarization converter 332, a 3B horizontal deflector 262, a 3B selective polarization conversion-splitter 133, and a third polarizer 430. Constituent elements of the third sub-beam deflection layer BDL3 may be arranged in the third direction DR3. The first color light L1, the second color light L2, and the third color light L3 may sequentially pass through the 3A selective polarization conversion-splitter 131, the 3A horizontal deflector 251, the 3A general-purpose polarization converter 331, the 3A vertical deflector 252, the 3rd selective polarization converter 132, the 3B vertical deflector 261, the 3B general-purpose polarization converter 332, the 3B horizontal deflector 262, the 3B selective polarization conversion-splitter 133, and the third polarizer 430.

The 3A horizontal deflector 251, the 3A general-purpose polarization converter 331, the 3A vertical deflector 252, the 3B vertical deflector 261, the 3B general-purpose polarization converter 332, the 3B horizontal deflector 262, and the third polarizer 430 respectively may be substantially the same as the 1A horizontal deflector 211, the 1A general-purpose polarization converter 311, the 1A vertical deflector 212, the 1B vertical deflector 221, the 1B general-purpose polarization converter 312, the 1B horizontal deflector 222, and the first polarizer 410 described above. For brevity of description, the descriptions of the 3A horizontal deflector 251, the 3A general-purpose polarization converter 331, the 3A vertical deflector 252, the 3B vertical deflector 261, and the 3B general-purpose polarization converter 332, the 3B horizontal deflector 262, and the third polarizer 430 are omitted.

The 3A selective polarization conversion-splitter 131 and the 3B selective polarization conversion-splitter 133 may have selectivity with respect to a second wavelength band. The 3A selective polarization conversion-splitter 131 and the 3B selective polarization conversion-splitter 133 may rotate the polarization direction of light in the third wavelength band by 45 degrees. For example, the 3A selective polarization conversion-splitter 131 and the 3B selective polarization conversion-splitter 133 may include an optically anisotropic polymer or inorganic material having wavelength selectivity with respect to a third wavelength band. For example, the 3A selective polarization conversion-splitter 131 and the 3B selective polarization conversion-splitter 133 may split light in the third wavelength band having a first polarization direction ⊙ in FIG. 2A, 2B, and 2C or ↔ in FIG. 3A, 3B, and 3C into light in the third wavelength band having the first polarization direction ⊙ in FIG. 2A, 2B, and 2C or ↔ in FIG. 3A, 3B, and 3C and light in the third wavelength band having a second polarization direction ↔ in FIG. 2A, 2B, and 2C or ⊙ in FIG. 3A, 3B, and 3C. However, splitting light in the second wavelength band may denote splitting in a polarization direction not spatial splitting. The light in the third wavelength band having the split first polarization direction ⊙ a in FIG. 2A, 2B, and 2C or ↔ in FIG. 3A, 3B, and 3C and the light in the third wavelength band having the second polarization direction ↔ in FIG. 2A, 2B, and 2C or ⊙ in FIG. 3A, 3B, and 3C may have the same wavelength band (i.e., the third wavelength band) and the same phase. The 3A selective polarization conversion-splitter 131 and the 3B selective polarization conversion-splitter 133 may maintain polarization directions of the 1Aa color light L1Aa and the 1Ba color light L1Ba having a first wavelength band and the third color light L3 having a third wavelength band.

The third selective polarization converter 132 may have selectivity with respect to the third wavelength band. The third selective polarization converter 132 may rotate the polarization direction of light in the third wavelength band by 90 degrees. For example, the third selective polarization converter 132 may include an optically anisotropic polymer or inorganic material having wavelength selectivity with respect to the third wavelength band. The third selective polarization converter 132 may change the polarization direction of light in the third wavelength band from a first polarization direction ⊙ in FIG. 2A, 2B, and 2C or ↔ in FIG. 3A, 3B, and 3C to a second polarization direction ↔ in FIG. 2A, 2B, and 2C or ⊙ in FIG. 3A, 3B, and 3C or from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The third selective polarization converter 132 may maintain polarization directions of the 1Aa color light L1Aa and the 1Ba color light L1Ba having a first wavelength band and the 2Aa color light L2Aa and the 2Ba color light L2Ba having a second wavelength band.

Hereinafter, a process in which a light beam passes through the third sub-beam deflection layer BDL3 will be described.

A light beam including the 1Aa color light L1Aa, the 1Ba color light L1Ba, the 2Aa color light L2Aa, the 2Ba color light L2Ba, and the third color light L3 may enter the 3A selective polarization conversion-splitter 131. The 1Aa color light L1Aa, the 1Ba color light L1Ba, the 2Aa color light L2Aa, the 2Ba color light L2Ba, and the third color light L3 may have a first polarization direction ⊙ in FIG. 2A, 2B, and 2C or ↔ in FIG. 3A, 3B, and 3C.

The 3A selective polarization conversion-splitter 131 may split the third color light L3 having the third wavelength band into 3A color light L3A having a second polarization direction ↔ in FIG. 2A, 2B, and 2C or ⊙ in FIG. 3A, 3B, and 3C and 3B color light L3B having a first polarization direction ⊙ in FIG. 2A, 2B, and 2C or ↔ in FIG. 3A, 3B, and 3C. The 3A selective polarization conversion-splitter 131 may maintain polarization directions of the 1Aa color light L1Aa, the 1Ba color light L1Ba, the 2Aa color light L2Aa, and the 2Ba color light L2Ba in the polarization direction ⊙ in FIG. 2A, 2B, and 2C or ↔ in FIG. 3A, 3B, and 3C. The 3A selective polarization conversion-splitter 131 may provide the 1Aa color light L1Aa, the 1Ba color light L1Ba, the 2Aa color light L2Aa, the 2Ba color light L2Ba, the 3A color light L3A, and the 3B color light L3B to the 3A horizontal deflector 251.

The 3A horizontal deflector 251 may horizontally deflect the 3A color light L3A having the second polarization direction ↔ in FIG. 2A, 2B, and 2C or ⊙ in FIG. 3A, 3B, and 3C. For example, the 3A color light L3A may be deflected in the second direction DR2 by the 3A horizontal deflector 251. The 3A horizontal deflector 251 may provide the 1Aa color light L1Aa, the 1Ba color light L1Ba, the 2Aa color light L2Aa, the 2Ba color light L2Ba, the 3A color light L3A, and the 3B color light L3B to the 3A general-purpose polarization converter 331.

The 3A general-purpose polarization converter 331 may change polarization directions of the 1Aa color light L1Aa, the 1Ba color light L1Ba, the 2Aa color light L2Aa, the 2Ba color light L2Ba, the 3A color light L3A, and the 3B color light L3B. For example, the 3A general-purpose polarization converter 331 may change the polarization directions of the 1Aa color light L1Aa, the 1Ba color light L1Ba, the 2Aa color light L2Aa, the 2Ba color light L2Ba, and the 3B color light L3B from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the 3A general-purpose polarization converter 331 may change the polarization direction of the 3A color light L3A from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The 3A general-purpose polarization converter 331 may provide the 1Aa color light L1Aa, the 1Ba color light L1Ba, the 2Aa color light L2Aa, the 2Ba color light L2Ba, the 3A color light L3A, and the 3B color light L3B to the 3A vertical deflector 252.

The 3A vertical deflector 252 may vertically deflect the 3A color light L3A having the first polarization direction ⊙ in FIG. 2A, 2B, and 2C or ↔ in FIG. 3A, 3B, and 3C. For example, the 3A color light L3A may be deflected in the first direction DR1 by the 3A vertical deflector 252. The 3A vertical deflector 252 may provide the 1Aa color light L1Aa, the 1Ba color light L1Ba, the 2Aa color light L2Aa, the 2Ba color light L2Ba, the 3A color light L3A, and the 3B color light L3B to the third selective polarization converter 132.

The third selective polarization converter 132 may change polarization directions of the 3A color light L3A and the 3B color light L3B having a third wavelength band. For example, the third selective polarization converter 132 may change the polarization direction of the 3A color light L3A from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. For example, the third selective polarization converter 132 may change the polarization direction of the 3B color light L3B from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. The third selective polarization converter 132 maintain the polarization directions of the 1Aa color light L1Aa, the 1Ba color light L1Ba, the 2Aa color light L2Aa, and the 2Ba color light L2Ba in the second polarization direction ↔ in FIG. 2A, 2B, and 2C or ⊙ in FIG. 3A, 3B, and 3C. The third selective polarization converter 132 may provide the 1Aa color light L1Aa, the 1Ba color light L1Ba, the 2Aa color light L2Aa, the 2Ba color light L2Ba, the 3A color light L3A, and the 3B color light L3B to the 3B vertical deflector 261.

The 3B vertical deflector 261 may vertically deflect the 3B color light L3B having the first polarization direction ⊙ in FIG. 2A, 2B, and 2C or ↔ in FIG. 3A, 3B, and 3C. For example, the 3B color light L3B may be deflected in the fifth direction DR5 by the 3B vertical deflector 261. The 3B vertical deflector 261 may provide the 1Aa color light L1Aa, the 1Ba color light L1Ba, the 2Aa color light L2Aa, the 2Ba color light L2Ba, the 3A color light L3A, and the 3B color light L3B to the 3B general-purpose polarization converter 332.

The 3B general-purpose polarization converter 332 may change polarization directions of the 1Aa color light L1Aa, the 1Ba color light L1Ba, the 2Aa color light L2Aa, the 2Ba color light L2Ba, the 3A color light L3A, and the 3B color light L3B. For example, the 3B general-purpose polarization converter 332 may change polarization directions of the 1Aa color light L1Aa, the 1Ba color light L1Ba, the 2Aa color light L2Aa, the 2Ba color light L2Ba, and the 3A color from the second polarization direction ↔ in FIG. 2A, 2B, and 2C or ⊙ in FIG. 3A, 3B, and 3C to the first polarization direction ⊙ in FIG. 2A, 2B, and 2C or ↔ in FIG. 3A, 3B, and 3C. For example, the 3B general-purpose polarization converter 332 may change the polarization direction of the 3B color light L3B from the first polarization direction ⊙ in FIG. 2A, 2B, and 2C or ↔ in FIG. 3A, 3B, and 3C to the second polarization direction ↔ in FIG. 2A, 2B, and 2C or ⊙ in FIG. 3A, 3B, and 3C. The 3B general-purpose polarization converter 332 may provide the 1Aa color light L1Aa, the 1Ba color light L1Ba, the 2Aa color light L2Aa, the 2Ba color light L2Ba, the 3A color light L3A, and the 3B color light L3B to the 3B horizontal deflector 262.

The 3B horizontal deflector 262 may horizontally deflect the 3B color light L3B having the second polarization direction ↔ in FIG. 2A, 2B, and 2C or ⊙ in FIG. 3A, 3B, and 3C. For example, the 3B color light L3B may be deflected in the fourth direction DR4 by the 3B horizontal deflector 262. The 3B horizontal deflector 262 may provide the 1Aa color light L1Aa, the 1Ba color light L1Ba, the 2Aa color light L2Aa, the 2Ba color light L2Ba, the 3A color light L3A, and the 3B color light L3B to the 3B selective polarization conversion-splitter 133.

The 3B selective polarization conversion-splitter 133 may split the 3A 0color light L3A having a third wavelength band into 3Aa color light L3Aa having the first polarization direction ⊙ in FIG. 2A, 2B, and 2C or ↔ in FIG. 3A, 3B, and 3C and 3Ab color light (L3Ab) having the second polarization direction ↔ in FIG. 2A, 2B, and 2C or ⊙ in FIG. 3A, 3B, and 3C. The 3B selective polarization conversion-splitter 133 may split the 3B color light L3B having a third wavelength band into 3Ba color light L3Ba having the first polarization direction ⊙ in FIG. 2A, 2B, and 2C or ↔ in FIG. 3A, 3B, and 3C and 3Bb color light L3Bb having the second polarization direction ↔ in FIG. 2A, 2B, and 2C or ⊙ in FIG. 3A, 3B, and 3C. The 3B selective polarization conversion-splitter 133 may maintain the polarization directions of the 1Aa color light L1Aa, the 1Ba color light L1Ba, the 2Aa color light L2Aa, and the 2Ba color light L2Ba in the first polarization direction ⊙ in FIG. 2A, 2B, and 2C or ↔ in FIG. 3A, 3B, and 3C. The 3B selective polarization conversion-splitter 133 may provide the 1Aa color light L1Aa, the 1Ba color light L1Ba, the 2Aa color light L2Aa, the 2Ba color light L2Ba, the 3Aa color light L3Aa, the 3Ab color light L3Ab, the 3Ba color light L3Ba, and the 3Bb color light L3Bb to the third polarizer 430.

The third polarizer 430 may transmit light having a first polarization direction. For example, the third polarizer 430 may transmit the 1Aa color light L1Aa, the 1Ba color light L1Ba, the 2Aa color light L2Aa, the 2Ba color light L2Ba, the 3Aa color light L3Aa, the 3Ba color light L3Ba.

The third sub-beam deflection layer BDL3 may split the third color light L3 into the 3Aa color light L3Aa and the 3Ba color light L3Ba that are deflected in different directions from each other. The third sub-beam deflection layer BDL3 may not deflect the 1Aa color light L1Aa, the 1Ba color light L1Ba, the 2Aa color light L2Aa, and the 2Ba color light L2Ba. The traveling directions of the 1Aa color light L1Aa, the 2Aa color light L2Aa, and the 3Aa color light L3Aa may be substantially the same. The 1Aa color light L1Aa, the 2Aa color light L2Aa, and the 3Aa color light L3Aa may be referred to as a first emission beam OB1. The traveling directions of the 1Ba color light L1Ba, the 2Ba color light L2Ba, and the 3Ba color light L3Ba may be substantially the same. The 1Ab color light L1Ab, the 2Ab color light L2Ab, and the 3Ab color light L3Ab may be referred to as a second emission beam OB2.

Figure 4:
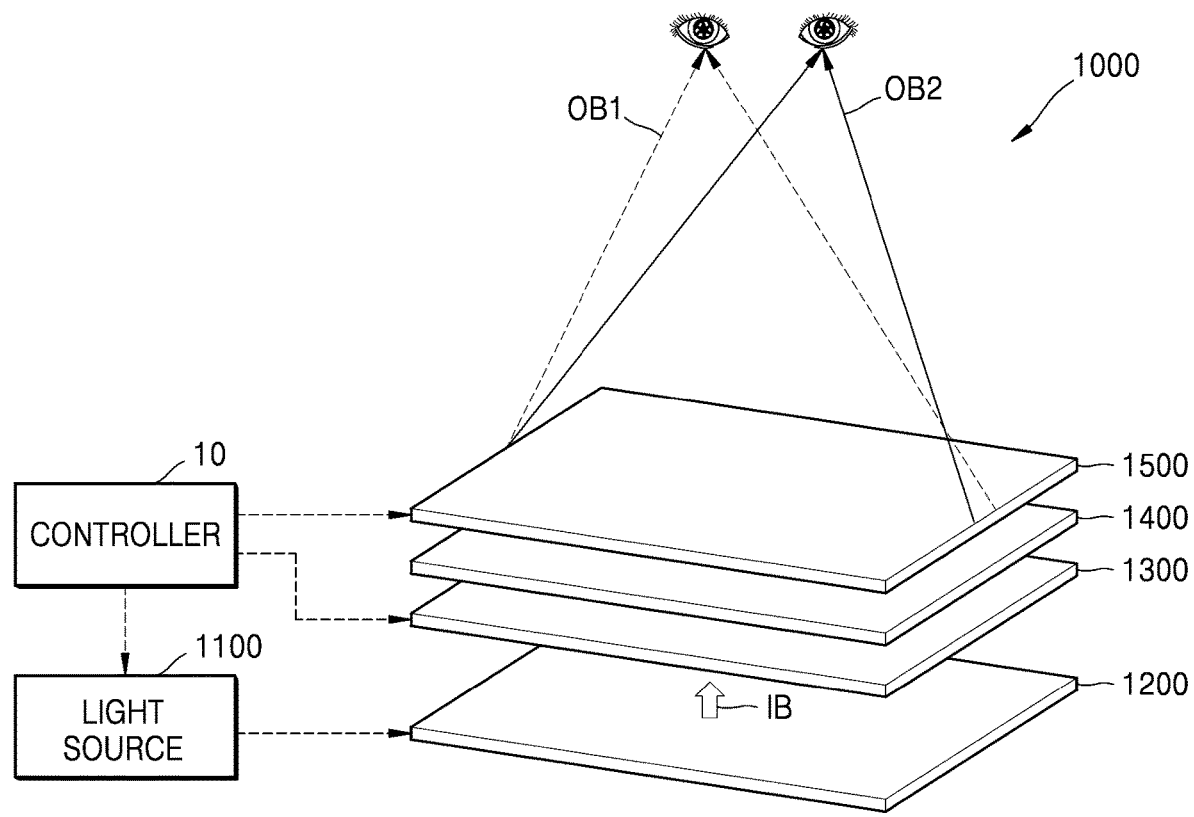
FIG. 4 is a conceptual diagram of a 3D display device according to an embodiment.

FIG. 4 is a conceptual diagram of a three-dimensional (3D) display device 1000 according to an embodiment. For brevity of description, substantially the descriptions as those given with reference to FIGS. 1, 2A-2C and 3A-3C may be omitted.

The 3D display device 1000 may include a light source 1100 configured to provide a coherent light beam including a plurality of wavelength bands, a light guide unit 1200 configured to guide light from the light source 1100 and to direct the light to a spatial light modulator 1500, a beam deflection layer 1300 for deflecting light from the light source 1100, a controller 10 configured to control a deflection direction of light in the beam deflection layer 1300, a field lens 1400 for focusing a hologram image on to a specified space, and the spatial light modulator 1500 configured to form a hologram image by diffracting incident light. According to an example embodiment, the specified space may be a predetermined space.

According to an example embodiment, the controller 10 may include a processor and a random access memory (RAM). The processor may include a central processing unit or a microprocessor, and the like, and may control an overall operation of the memory controller. The processor may communicate with a memory device 10 through the memory interface. The processor may use the RAM as an operation memory, cache memory, or buffer memory to control the memory device.

The beam deflection layer 1300 may include the beam deflection layer 1 of FIGS. 1, 2A-2C and 3A-3C.

Light emitted from the light source 1100 is guided by the light guide unit 1200 and is enlarged to a size corresponding to the spatial light modulator 1500, and incident on the beam deflection layer 1300 as incident beam of light IB. The beam deflection layer 1300 may deflect the direction of the incident light in a desired direction, for example, in a direction toward the left eye and a direction toward the right eye of a user. In order to form directional light, light incident on the beam deflection layer 1300 may be simultaneously deflected in two directions different from each other by the controller 10.

The two directional beams emitted through the beam deflection layer 1300 (i.e., first and second emission beams OB1 and OB2) enter the spatial light modulator 1500 through the field lens 1400. The spatial light modulator 1500 forms a hologram pattern having an interference fringe for modulating incident light. A hologram image may be reproduced at a position on a predetermined space by diffracting and modulating incident light by a hologram pattern formed in the spatial light modulator 1500. The left-eye hologram image may be reproduced in the left-eye position and the right-eye hologram image in the right-eye position.

The 3D display device 1000 of FIG. 4 may further include an eye tracking sensor that tracks a user's left-eye position and right-eye position. For example, the controller 10 may control the eye tracking sensor track a user's left-eye position and right-eye position to emit a beam deflected to the corresponding positions by using the eye tracking sensor.

Figure 5:
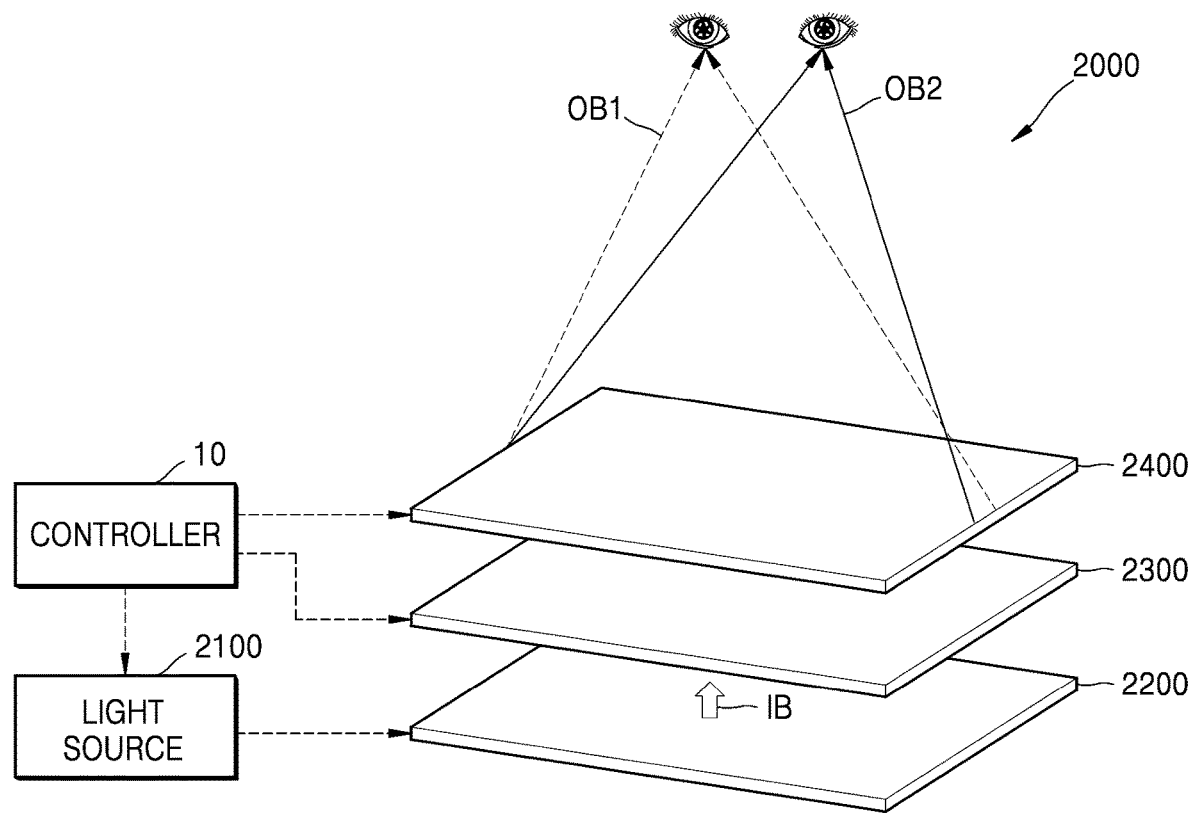
FIG. 5 is a conceptual diagram of a 3D display device according to another embodiment.

FIG. 5 is a conceptual diagram of a 3D display device 2000 according to another example embodiment. For brevity of explanation, differences from those described with reference to FIGS. 1, 2A-2C, 3A-3C and 4 will be described.

The 3D display device 2000 may include a light source 2100 configured to provide a coherent light beam including a plurality of wavelength bands, a light guide unit 2200 configured to guide light from the light source 2100 and direct the light to a spatial light modulator 2400, a beam deflection layer 2300 for deflecting light from the light source 2100, a controller 10 configured to control a direction for deflecting light in the beam deflection layer 2300, and the spatial light modulator 2400 configured to form a hologram image by diffracting incident light.

Unlike the 3D display device 1000 of FIG. 4, the beam deflection layer 2300 may respectively focus first and second emission beams OB1 and OB2 at different positions from each other. For example, the beam deflection layer 2300 may deflect the first and second emission beams OB1 and OB2 in directions toward the left eye and the right eye of the user, respectively, and may focus on the left and right eyes. Accordingly, a left-eye hologram image may be reproduced in the left-eye position and a right-eye hologram image may be reproduced in the right-eye position without the field lens 1400 illustrated in FIG. 4.

The 3D display device 2000 of FIG. 5 may further include an eye tracking sensor that tracks a user's left-eye position and right-eye position. For example, the controller 10 may control the eye tracking sensor to track a user's left-eye position and right-eye position to emit a beam deflected to the corresponding positions by using the eye tracking sensor.

The disclosure may provide a beam deflection layer that deflects a beam including light having different wavelength bands from each other.

The disclosure may provide a 3D display device having a beam deflector that deflects a beam including light having different wavelength bands from each other.

According to an example embodiment, the disclosure may provide a method of performing beam deflection. The method may include dividing an incident light beam into a first polarized light and second polarized light, the first polarized light and the second polarized light having a first wavelength band and having different polarization directions, deflecting the first polarized light in a first direction; converting polarization directions of the first polarized light and the second polarized light after deflecting the first polarized light, and deflecting the second polarized light in a second direction after the converting the polarization directions of the first polarized light and the second polarized light.

According to an example embodiment, the disclosure may provide a control apparatus. The control apparatus may include a memory storing one or more instructions and a processor configured to execute the one or more instructions to control a beam deflector to: divide an incident light beam into a first polarized light and second polarized light, the first polarized light and the second polarized light having a first wavelength band and having different polarization directions, deflect the first polarized light in a first direction, convert polarization directions of the first polarized light and the second polarized light after deflecting the first polarized light; and deflect the second polarized light in a second direction after the converting the polarization directions of the first polarized light and the second polarized light.

However, the effects of the inventive concept may not be limited to the above disclosure.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A beam deflection layer comprising:
 a first selective polarization conversion-splitter comprising at least one of a first optically anisotropic polymer or a first inorganic material having wavelength selectivity with respect to first color light, the first selective polarization conversion-splitter configured to:
  receive an incident light beam comprising the first color light, second color light and third color light, the incident light beam propagating in a first direction from a light source, and
  selectively split the first color light in the incident light beam into first color light of first polarization and first color light of second polarization based on the at least one of the first optically anisotropic polymer or the first inorganic material, the first color light of the first polarization having a polarization direction different from the first color light of the second polarization;
 a first beam deflector provided in front of the first selective polarization conversion-splitter in the first direction, the first beam deflector comprising one or more first liquid crystal layers, and the one or more first liquid crystal layers configured to:
  deflect the first color light of the first polarization from the first selective polarization conversion-splitter in a second direction different from the first direction to output deflected first color light of the first polarization, and
  allow the first color light of the second polarization pass through the one or more first liquid crystal layers without deflection;
 a first selective polarization converter provided in front of the first beam deflector in the first direction, and comprising at least one of a second optically anisotropic polymer or a second inorganic material having wavelength selectivity with respect to the first color light, the first selective polarization converter configured to convert polarization directions of the deflected first color light of the first polarization and the first color light of the second polarization without deflection from the first beam deflector by the at least one of the second optically anisotropic polymer or the second inorganic material;
 a second beam deflector provided in front of the first selective polarization converter in the first direction and comprising one or more second liquid crystal layers, the one or more second liquid crystal layers configured to:
  deflect the first color light of the second polarization from the first selective polarization converter in a third direction different from the first direction to output deflected first color light of the second polarization, and
  allow the deflected first color light of the first polarization to pass through the one or more second liquid crystal layers without deflection;
 a second selective polarization conversion-splitter configured to:
  split the deflected first color light of the first polarization from the second beam deflector into first color light of the first polarization deflected in the second direction and first color light of the second polarization deflected in the second direction, and
  split the deflected first color light of the second polarization from the second beam deflector into first color light of the first polarization deflected in the third direction and first color light of the second polarization deflected in the third direction; and
 a first polarizer configured to transmit light having one polarization direction among the first color light of the first polarization deflected in the second direction, the first color light of the second polarization deflected in the second direction, the first color light of the first polarization deflected in the third direction and the first color light of the second polarization deflected in the third direction from the second selective polarization conversion-splitter,
 wherein each of the first color light, the first color light of the first polarization, and the first color light of the second polarization is in a first wavelength band, wherein the second color light and the third color light sequentially pass through the first selective polarization conversion-splitter, the first beam deflector, the first selective polarization converter, the second beam deflector, the second selective polarization conversion-splitter and the first polarizer without deflection and polarization conversion, wherein the beam deflection layer is a multi-level structure comprising a plurality of levels, wherein the first selective polarization conversion-splitter, the first beam deflector, the first selective polarization converter, the second beam deflector, the second selective polarization conversion-splitter and the first polarizer are sequentially arranged as one of the plurality of levels of the multi-level structure, and wherein the first color light, the second color light and the third color light simultaneously pass through each of the first selective polarization conversion-splitter, the first beam deflector, the first selective polarization converter, the second beam deflector, the second selective polarization conversion-splitter and the first polarizer for the first color light of the first polarization deflected in the second direction, the first color light of the first polarization deflected in the third direction, the second color light without deflection and polarization conversion and the third color light without deflection and polarization conversion to be output from the first polarizer.

2. The beam deflection layer of claim 1, wherein the first selective polarization conversion-splitter is further configured to rotate the polarization direction of the first color light by 45 degrees.

3. The beam deflection layer of claim 1, wherein the first beam deflector comprises:
a first horizontal deflector configured to horizontally deflect the first color light of the first polarization from the first selective polarization conversion-splitter to output horizontally deflected first color light of the first polarization;
a first general-purpose polarization converter configured to convert a polarization direction of the horizontally deflected first color light of the first polarization from the first horizontal deflector; and
a first vertical deflector configured to vertically deflect the horizontally deflected first color light of the first polarization from the first general-purpose polarization converter.

4. The beam deflection layer of claim 1, wherein the first selective polarization converter is further configured to rotate polarization directions of the deflected first color light of the first polarization and the first color light of the second polarization from the first beam deflector by 90 degrees.

5. The beam deflection layer of claim 1, wherein the second beam deflector comprises:
a second vertical deflector configured to vertically deflect the first color light of the second polarization from the first selective polarization converter to output vertically deflected first color light of the second polarization;
a second general-purpose polarization converter configured to convert a polarization direction of the vertically deflected first color light of the second polarization from the second vertical deflector; and
a second horizontal configured to horizontally deflect the vertically deflected first color light of the second polarization from the second general-purpose polarization converter.

6. The beam deflection layer of claim 1, wherein the second selective polarization conversion-splitter is further configured to rotate the polarization directions of the first color light of the first polarization and the first color light of the second polarization from the second beam deflector by 45 degrees.

7. The beam deflection layer of claim 1, further comprising:
a third selective polarization conversion-splitter configured to split the second color light in the light beam from the first polarizer into second color light of the first polarization and second color light of the second polarization;
a third beam deflector configured to deflect the second color light of the first polarization from the third selective polarization conversion-splitter to output deflected second color light of the first polarization;
a second selective polarization converter configured to convert polarization directions of the deflected second color light of the first polarization and the second color light of the second polarization from the third beam deflector; and
a fourth beam deflector configured to deflect the second color light of the second polarization from the second selective polarization converter to output deflected second color light of the second polarization,
wherein each of the second color light, the second color light of the first polarization, and the second color light of the second polarization is in a second wavelength band different from the first wavelength band.

8. The beam deflection layer of claim 7, wherein the third selective polarization conversion-splitter is further configured to rotate the polarization direction of the second color light by 45 degrees.

9. The beam deflection layer of claim 7, wherein the second selective polarization converter is further configured to rotate polarization directions of the second color light of the first polarization and the second color light of the second polarization from the third beam deflector by 90 degrees.

10. The beam deflection layer of claim 7, wherein
the third beam deflector comprises:
a third horizontal deflector configured to horizontally deflect the second color light of the first polarization from the third selective polarization conversion-splitter to output horizontally deflected second color light of the first polarization;
a third general-purpose polarization converter configured to convert a polarization direction of the horizontally deflected second color light of the first polarization from the third horizontal deflector; and
a third vertical deflector configured to vertically deflect the horizontally deflected second color light of the first polarization from the third general-purpose polarization converter, and
the fourth beam deflector comprises:
a fourth vertical deflector that vertically deflects the second color light of the second polarization from the second selective polarization converter to output vertically deflected second color light of the second polarization;
a fourth general-purpose polarization converter configured to convert a polarization direction of the vertically deflected second color light of the second polarization from the fourth vertical deflector; and a fourth horizontal deflector configured to horizontally deflect the vertically deflected second color light of the first polarization from the fourth general-purpose polarization converter.

11. The beam deflection layer of claim 7, further comprising:
a fourth selective polarization conversion-splitter configured to:
split the deflected second color light of the first polarization from the fourth beam deflector into second color light of the first polarization deflected in the second direction and second color light of the first polarization in the third direction, and
split the deflected second color light of the second polarization from the fourth beam deflector into second color light of the second polarization deflected in the second direction and second color light of the second polarization deflected in the third direction; and
a second polarizer configured to pass light having the one polarization direction among the second color light of the first polarization deflected in the second direction, the second color light of the first polarization in the third direction, the second color light of the second polarization deflected in the second direction and the second color light of the second polarization deflected in the third direction from the fourth selective polarization conversion-splitter,
wherein the fourth selective polarization conversion-splitter is further configured to rotate the polarization directions of the second color light of the first polarization and the second color light of the second polarization from the fourth beam deflector by 45 degrees.

12. The beam deflection layer of claim 11, further comprising:
a fifth selective polarization conversion-splitter configured to split the third color light of the light beam received from the second polarizer into third color light of the first polarization and third color light of the second polarization;
a fifth beam deflector configured to deflect the third color light of the first polarization from the fifth selective polarization conversion-splitter to output deflected third color light of the first polarization;
a third selective polarization converter that converts polarization directions of the deflected third color light of the first polarization and the third color light of the second polarization from the fifth beam deflector; and
a sixth beam deflector that deflects the third color light of the second polarization from the third selective polarization converter to output deflected second third color light,
wherein each of the third color light, the third color light of the first polarization, and the third color light of the second polarization is in a third band wavelength different from the first wavelength band and the second wavelength band.

13. The beam deflection layer of claim 12, wherein the fifth selective polarization conversion-splitter is further configured to rotate the polarization direction of the third color light by 45 degrees.

14. The beam deflection layer of claim 12, wherein the third selective polarization converter is further configured to rotate polarization directions of the third color light of the first polarization and the third color light of the second polarization by 90 degrees.

15. The beam deflection layer of claim 12, wherein the fifth beam deflector comprises:
a fifth horizontal deflector configured to horizontally deflect the third color light of the first polarization from the fifth selective polarization conversion-splitter to output horizontally deflected third color light of the first polarization;
a fifth general-purpose polarization converter configured to convert polarization directions of the horizontally deflected third color light of the first polarization from the fifth horizontal deflector; and
a fifth vertical deflector that vertically deflects the horizontally deflected third color light of the first polarization from the fifth general-purpose polarization converter, and
the sixth beam deflector comprises:
a sixth vertical deflector configured to vertically deflect the third color light of the second polarization from the third selective polarization converter to output vertically deflected third color light of the second polarization;
a sixth general-purpose polarization converter configured to convert polarization directions of the vertically deflected third color light of the second polarization from the sixth vertical deflector; and
a sixth horizontal deflector configured to horizontally deflect the vertically deflected third color light of the second polarization from the sixth general-purpose polarization converter.

16. The beam deflection layer of claim 15, further comprising:
a sixth selective polarization conversion-splitter configured to:
split the deflected third color light of the first polarization from the sixth beam deflector into third color light of the first polarization deflected in the second direction and third color light of the first polarization deflected in the third direction, and
split the deflected third color light of the second polarization from the sixth beam deflector into third color light of the second polarization deflected in the second direction and third color light of the second polarization deflected in the third direction; and
a third polarizer configured to pass light having the one polarization direction among the third color light of the first polarization deflected in the second direction, the third color light of the first polarization deflected in the third direction, the third color light of the second polarization deflected in the second direction and the third color light of the second polarization deflected in the third direction from the sixth selective polarization conversion-splitter, wherein
the sixth selective polarization conversion-splitter is further configured to rotate the polarization directions of the third color light of the first polarization and the third color light of the second polarization from the sixth beam deflector by 45 degrees.

17. A three-dimensional display device comprising:
a light source configured to output an optical beam in a plurality of wavelength bands;
a beam deflection layer configured to deflect the light beam;
a controller configured to control a deflection direction of the light beam in the beam deflection layer; and
a spatial light modulator configured to form a holographic image by diffracting the light beam, wherein the beam deflection layer comprises:
a first selective polarization conversion-splitter comprising at least one of a first optically anisotropic polymer or a first inorganic material having wavelength selectivity with respect to first color light, the first selective polarization conversion-splitter configured to:
receive an incident light beam comprising the first color light, second color light and third color light, the incident light beam propagating in a first direction from the light source, and
selectively split the first color light in the incident light beam into first color light of first polarization and first color light of second polarization based on the at least one of the first optically anisotropic polymer or the first inorganic material, the first color light of the first polarization having a polarization direction different from the first color light of the second polarization;
a first beam deflector provided in front of the first selective polarization conversion- splitter in the first direction, the first beam deflector comprising one or more first liquid crystal layers, and the one or more first liquid crystal layers configured to:
deflect the first color light of the first polarization from the first selective polarization conversion-splitter in a second direction different from the first direction to output deflected first color light of the first polarization, and
allow the first color light of the second polarization pass through the one or more first liquid crystal layers without deflection;
a first selective polarization converter provided in front of the first beam deflector in the first direction, and comprising at least one of a second optically anisotropic polymer or a second inorganic material having wavelength selectivity with respect to the first color light, the first selective polarization converter configured to convert polarization directions of the deflected first color light of the first polarization and the first color light of the second polarization without deflection from the first beam deflector by the at least one of the second optically anisotropic polymer or the second inorganic material;
a second beam deflector provided in front of the first selective polarization converter in the first direction and comprising one or more second liquid crystal layers, the one or more second liquid crystal layers configured to:
deflect the first color light of the second polarization from the first selective polarization converter in a third direction different from the first direction to output deflected first color light of the second polarization, and allow the deflected first color light of the first polarization to pass through the one or more second liquid crystal layers without deflection;
a second selective polarization conversion-splitter configured to:
split the deflected first color light of the first polarization from the second beam deflector into first color light of the first polarization deflected in the second direction and first color light of the second polarization deflected in the second direction, and
split the deflected first color light of the second polarization from the second beam deflector into first color light of the first polarization deflected in the third direction and first color light of the second polarization deflected in the third direction; and
a first polarizer configured to transmit light having one polarization direction among the first color light of the first polarization deflected in the second direction, the first color light of the second polarization deflected in the second direction, the first color light of the first polarization deflected in the third direction and the first color light of the second polarization deflected in the third direction from the second selective polarization conversion-splitter,
wherein each of the first color light, the first color light of the first polarization, and the first color light of the second polarization is in a first wavelength band,
wherein the second color light and the third color light sequentially pass through the first selective polarization conversion-splitter, the first beam deflector, the first selective polarization converter, the second beam deflector, the second selective polarization conversion-splitter and the first polarizer without deflection and polarization conversion,
wherein the beam deflection layer is a multi-level structure comprising a plurality of levels,
wherein the first selective polarization conversion-splitter, the first beam deflector, the first selective polarization converter, the second beam deflector, the second selective polarization conversion-splitter and the first polarizer are sequentially arranged as one of the plurality of levels of the multi-level structure, and
wherein the first color light, the second color light and the third color light simultaneously pass through each of the first selective polarization conversion-splitter, the first beam deflector, the first selective polarization converter, the second beam deflector, the second selective polarization conversion-splitter and the first polarizer for the first color light of the first polarization deflected in the second direction, the first color light of the first polarization deflected in the third direction, the second color light without deflection and polarization conversion and the third color light without deflection and polarization conversion to be output from the first polarizer.

18. The three-dimensional display device of claim 17, wherein the controller is further configured to control the beam deflection layer to focus a first part of the light beam towards a first position and focus a second part of the light beam towards a second position different from the first position.

19. The three-dimensional display device of claim 17, further comprising:
a field lens provided between the beam deflection layer and the spatial light modulator, wherein the field lens is configured to focus a first part of the light beam towards a first position and focus a second part of the light beam towards a second position different from the first position.

20. A beam deflection apparatus comprising:
a first layer comprising at least one of a first optically anisotropic polymer or a first inorganic material having wavelength selectivity with respect to first color light, the first layer configured to:
receive incident light beam comprising the first color light, second color light and third color light, the incident light beam propagating in a first direction from a light source, and
selectively split the first color light in the incident light beam into first color light of first polarization and first color light of second polarization based on the at least one of the first optically anisotropic polymer or the first inorganic material, the first color light of the first polarization having a polarization direction different from the first color light of the second polarization;

a second layer provided in front of the first layer in the first direction, the second layer comprising one or more first liquid crystal layers, and the one or more first liquid crystal layers configured to:
  deflect the first color light of the first polarization from the first layer in a second direction different from the first direction to output deflected first color light of the first polarization, and
  allow the first color light of the second polarization pass through the one or more first liquid crystal layers without deflection;

a third layer provided in front of the second layer in the first direction, and comprising at least one of a second optically anisotropic polymer or a second inorganic material having wavelength selectivity with respect to the first color light, the third layer configured to convert polarization directions of the deflected first color light of the first polarization and the first color light of the second polarization without deflection from the second layer by the at least one of the second optically anisotropic polymer or the second inorganic material;

a fourth layer provided in front of the third layer in the first direction and comprising one or more second liquid crystal layers, the one or more second liquid crystal layers configured to:
  deflect the first color light of the second polarization from the third layer in a third direction different from the first direction to output deflected first color light of the second polarization, and
  allow the deflected first color light of the first polarization to pass through the one or more second liquid crystal layers without deflection .;

a fifth layer configured to:
  split the deflected first color light of the first polarization from the fourth layer into first color light of the first polarization deflected in the second direction and first color light of the second polarization deflected in the second direction, and
  split the deflected first color light of the second polarization from the fourth layer into first color light of the first polarization deflected in the third direction and first color light of the second polarization deflected in the third direction; and a sixth layer configured to transmit light having one polarization direction among the first color light of the first polarization deflected in the second direction, the first color light of the second polarization deflected in the second direction, the first color light of the first polarization deflected in the third direction and the first color light of the second polarization deflected in the third direction from the fifth layer, wherein each of the first color light, the first color light of the first polarization, and the first color light of the second polarization is in a first wavelength band, wherein the second color light and the third color light sequentially pass through the first layer, the second layer, the third layer, the fourth layer, the fifth layer, and the sixth layer without deflection and polarization conversion, wherein the beam deflection apparatus is a multi-level structure comprising a plurality of levels, wherein the first layer, the second layer, the third layer, the fourth layer, the fifth layer and the sixth layer are sequentially arranged as one of the plurality of levels of the multi-level structure, and wherein the first color light, the second color light and the third color light simultaneously pass through each of the first layer, the second layer, the third layer, the fourth layer, the fifth layer and the sixth layer for the first color light of the first polarization deflected in the second direction, the first color light of the first polarization deflected in the third direction, the second color light without deflection and polarization conversion and the third color light without deflection and polarization conversion to be output from the sixth layer.

21. A method of performing beam deflection by a beam deflector including a plurality of layers, the method comprising:

selectively dividing, by a first layer among the plurality of layers, an incident light beam propagating in a first direction into a first polarized light and second polarized light, the first polarized light and the second polarized light having a first wavelength band and having different polarization directions;

deflecting, by a second layer among the plurality of layers, the first polarized light in a second direction and allowing the second polarized light to pass through the second layer in the first direction;

converting, by a third layer among the plurality of layers, polarization directions of the first polarized light propagating in the second direction and the second polarized light propagating in the first direction after deflecting the first polarized light;

deflecting, by a fourth layer among the plurality of layers, the second polarized light in a third direction after the converting the polarization directions of the first polarized light and the second polarized light;

splitting, by a fifth layer, the deflected first color light of the first polarization from the fourth layer into first color light of the first polarization deflected in the second direction and first color light of the second polarization deflected in the second direction;

splitting, by the fifth layer, the deflected first color light of the second polarization from the fourth layer into first color light of the first polarization deflected in the third direction and first color light of the second polarization deflected in the third direction; and transmitting, by a sixth layer, light having one polarization direction among the first color light of the first polarization deflected in the second direction, the first color light of the second polarization deflected in the second direction, the first color light of the first polarization deflected in the third direction and the first color light of the second polarization deflected in the third direction from the fifth layer, wherein each of the first color light, the first color light of the first polarization, and the first color light of the second polarization is in a first wavelength band, wherein the second color light and the third color light sequentially pass through the first layer, the second layer, the third layer, the fourth layer, the fifth layer, and the sixth layer without deflection and polarization conversion, wherein the beam deflector is a multi-level structure comprising a plurality of levels, wherein the first layer, the second layer, the third layer, the fourth layer, the fifth layer and the sixth layer are sequentially arranged as one of the plurality of levels of the multi-level structure, and wherein the first color light, the second color light and the third color light simultaneously pass through each of the first layer, the second layer, the third layer, the fourth layer, the fifth layer and the sixth layer for the first color light of the first polarization deflected in the second direction, the first color light of the first polarization deflected in the third direction, the second color light without deflection and polarization conversion and the third color light without deflection and polarization conversion to be output from the sixth layer.

22. A control apparatus comprising:
a memory storing one or more instructions, and
a processor configured to execute the one or more instructions to control a beam deflector comprising a plurality of layers to:
control a first layer, among the plurality of layers, to selectively divide an incident light beam propagating in a first direction into a first polarized light and second polarized light by at least one of a first optically anisotropic polymer or a first inorganic material having wavelength selectivity with respect to the first wavelength band, the first polarized light and the second polarized light having the first wavelength band and having different polarization directions;
control a second layer, among the plurality of layers, to deflect the first polarized light among the first polarized light and the second polarized light from the first optically anisotropic polymer or the first inorganic material in a second direction to output deflected first polarized light and the second polarized light without deflection by one or more first liquid crystal layers;
control a third layer, among the plurality of layers, to convert polarization directions of the deflected first polarized light and the second polarized light without deflection from the one or more first liquid crystal layers by at least one of a second optically anisotropic polymer or a second inorganic material having wavelength selectivity with respect to the first wavelength band;
control a fourth layer, among the plurality of layers, to deflect the second polarized light in a third direction among the deflected first polarized light and the second polarized light without deflection from the second optically anisotropic polymer or the second inorganic material in a second direction to output deflected second polarized light and the deflected first polarized light by one or more second liquid crystal layers;
control a fifth layer, among the plurality of layers, to:
split the deflected first color light of the first polarization from the fourth layer into first color light of the first polarization deflected in the second direction and first color light of the second polarization deflected in the second direction, and
split the deflected first color light of the second polarization from the fourth layer into first color light of the first polarization deflected in the third direction and first color light of the second polarization deflected in the third direction; and
control a sixth layer, among the plurality of layers, to transmit light having one polarization direction among the first color light of the first polarization deflected in the second direction, the first color light of the second polarization deflected in the second direction, the first color light of the first polarization deflected in the third direction and the first color light of the second polarization deflected in the third direction from the fifth layer,
wherein each of the first color light, the first color light of the first polarization, and the first color light of the second polarization is in a first wavelength band, and
wherein the second color light and the third color light sequentially pass through the first layer, the second layer, the third layer, the fourth layer, the fifth layer, and the sixth layer without deflection and polarization conversion,
wherein the beam deflector is a multi-level structure comprising a plurality of levels,
wherein the first layer, the second layer, the third layer, the fourth layer, the fifth layer and the sixth layer are sequentially arranged as one of the plurality of levels of the multi-level structure, and
wherein the first color light, the second color light and the third color light simultaneously pass through each of the first layer, the second layer, the third layer, the fourth layer, the fifth layer and the sixth layer for the first color light of the first polarization deflected in the second direction, the first color light of the first polarization deflected in the third direction, the second color light without deflection and polarization conversion and the third color light without deflection and polarization conversion to be output from the sixth layer.

23. The beam deflection layer of claim 1, wherein the incident light beam includes the first color light, and a second color light, and
wherein the first selective polarization conversion-splitter is further configured to split only the first color light, among the first color light and the second color light in the incident light beam into the first color light of the first polarization and the first color light of the second polarization.

* * * * *